April 2, 1968 J. W. ARMBRUSTER 3,376,551

MAGNETIC WRITING DEVICES

Filed May 21, 1964 12 Sheets-Sheet 1

INVENTOR.

John W Armbruster

April 2, 1968 J. W. ARMBRUSTER 3,376,551

MAGNETIC WRITING DEVICES

Filed May 21, 1964

12 Sheets-Sheet 5

April 2, 1968 J. W. ARMBRUSTER 3,376,551

MAGNETIC WRITING DEVICES

Filed May 21, 1964 12 Sheets-Sheet 6

April 2, 1968 J. W. ARMBRUSTER 3,376,551

MAGNETIC WRITING DEVICES

Filed May 21, 1964

12 Sheets-Sheet 7

April 2, 1968 J. W. ARMBRUSTER 3,376,551

MAGNETIC WRITING DEVICES

Filed May 21, 1964 12 Sheets-Sheet 8

April 2, 1968 J. W. ARMBRUSTER 3,376,551

MAGNETIC WRITING DEVICES

Filed May 21, 1964 12 Sheets-Sheet 9

April 2, 1968 J. W. ARMBRUSTER 3,376,551

MAGNETIC WRITING DEVICES

Filed May 21, 1964 12 Sheets-Sheet 10

United States Patent Office 3,376,551
Patented Apr. 2, 1968

3,376,551
MAGNETIC WRITING DEVICES

John W. Armbruster, North Tarrytown, N.Y., assignor to International Business Machines Corporation, New York, N.Y., a corporation of New York Filed May 21, 1964, Ser. No. 369,155
31 Claims. (Cl. 340—172.5)

This invention relates in general to advanced forms of writing instruments and more particularly to ball point fountain pens wherein the ball tip in addition to its usual ink spreading control function is a magnet associated with stationary side windings or wire coils so that the ball when rotated and gyrated in forming written characters also moves and shifts its magnet flux to cut across said windings in varying and distinctive patterns to induce and generate in, and emit through, said windings distinctive electrical effects in waveforms related to characters written, as they are written. In other words, real time character recognition signals of an electronic input nature are generated by simple, every day means so that they may be amplified, decoded and utilized for control of recorders, facsimile devices, computers or any device susceptible to input signals.

Heretofore, input devices required skilled operators such as typists or card punch operators, or elaborate optical or magnetic character recognition equipment to sense written or printed material long after a recording was made. Now by means of the present magnetic pen, unskilled persons able to write or trace characters are enabled to control sophisticated equipment by simple input means operated in an ordinary fashion. Anyone with reading and writing training can take part in the control of electronic systems by merely writing in the normal manner. The ball point pen is suspended freely to move with writing movements in the ordinary fashion and is not interfered with by any of the electronic generating controls which are added by the proposals of the present invention. In order to initially orient the magnetic ball of the ball point pen, i.e., provide a reference point or starting position, it is proposed that one or more bar magnets or a horseshoe magnet be placed with one or more poles near the tip of the pen and near the ball surface but removed from the windings so that a pole of the magnetized ball is brought around to one certain home position everytime the pen is lifted away from the recording surface. Such homing attraction is not strong enough to hinder ball writing movement.

In addition to the character recording attributes of the magnetic pen of this invention there are features of graphical mensuration to be considered because the ball pen is adapted for novel depiction and control of vector analysis and measurement of lines, areas, volumes and fourth dimension figures as well as angles. Since the ball may be made of a circumference which is equal to, or a regular division of, a chart scale unit and since the ball is oriented initially angularly with respect to a generator winding, it is apparent that by merely rolling the pen ball point at a certain angle for a certain distance, or around a certain area, or around a certain volume, with or without inking, there is generated a set of differentiated electrical digital pulses as well as electrical waveforms interpretive of the manner in which such pulses are related to angles, arcs and all areas or surfaces of solid generation. As an example of a fourth dimensional use of the magnetic ball point pen, it may be assumed that time is the fourth factor or law to be followed regarding a solid that is defined in three dimensions. For example, in the case of two intersecting spheres there is an oblate form of solid between them which could be circumscribed by the pen as to all outer dimensions and, as this is done, there could be superimposed, for example, a rate of etch as a time factor which would vary according to the size of a solid so that the net result would be the definition of a solid and the determination of the time it would take to completely dissolve such a solid, or etch it to a selected depth, etc. A Hall device on the pen as a magnetic flux device could be influenced by both the dimensional pen excursion and calculation, and the introduced etched time factor. This invention in providing a means for an intimate connection between a person capable of forming symbols, characters, numbers, angles and data in general, and an electronic device for processing such data, there is created for the first time, direct utilization of manpower on a massive scale for the parallel control by relatively unskilled help over elaborate operations. For example, the largest department store may be operated on a real time basis with a minute-by-minute inventory and stock replenishment check since the pen recordings of all clerical help are directly effective without need for intermediate change to any machine language media.

From the foregoing it may be gathered that it is an object of the invention to provide electrical generating means associated with a magnetic ball of a ball point fountain pen to generate signals representative of writing movements.

Another object of the invention is to provide a magnetic pen with amplifying and decoding means to control a recording device such as a typewriter.

Another object is to provide a magnetic pen device with amplifying means and direct signal delivery instrumentalities for reproduction control of a recording device such as a facsimile writing recorder.

Another object of the invention is to provide a novel method of recording wherein the ball of a recorder such as a ball point pen is to be of magnetizable material and magnetized as a spherical permanet magnet.

Although the magnetic ball is to perform its usual writing and ink marking function, it is to be surrounded with one or more wire windings imbedded in or printed as a printed circuit on the sides of the ball mount to simulate a generator with the difference that the present ball windings may be separated and staggered in placement to better receive varying signals generated by directional field flux movement produced by the gyrating magnet ball. A freely turning ball is one variation or modification, and as an alternative it is contemplated to provide a ball having a normal "start" position wherein the magnetic axis of the ball is aligned with a certain position, which position is occupied by the pole of an adjustable bar magnet, or a dual magnet having a shape of a horseshoe and cooperating with both poles of the ball magnet. When the magnetized ball is polarized, it has a fixed start position which would be assumed everytime the pen is lifted from the paper and in operation the ball when writing would not only tilt left or right but roll freely vertically up and down and have many combined movements.

An object is to provide a control writing instrument which is not only effective when writing long hand but especially effective also in not only writing, but also translating, shorthand. Since all that is needed is a subtle difference in a generated electrical waveform to differentiate between letters and different word signs it is notable to realize that direct typing control may be based on short quick shorthand strokes of the present magnetic ball pen. When shorthand code movements are directly related to an electrical typing machine of the kind having combination controls, there is devised a direct control of typing as shorthand is being recorded.

An object is to provide a simple facsimile recording system wherein the message sender is a magnetic ball point pen and the message receiver a walking ball form of recorder having small motors to drive the ball and duplicate the motion of the generating ball of the sender. In this way there is a direct electrical coupling between the writing balls, one of which when recording is also generating directional electrical signals to control the motorized writing ball of the receiver to follow a duplicating ink recording path at the same time.

Another object is to provide improved input devices for control of data processing equipment. For such purposes a ball magnet input device may be motivated automatically or manually to make code movements in binary or other codes and thus enter by directly generated impulses, numerical, alphabetical, and chronological process control effects, or other data to be stored and treated mathematically.

Another object is to provide an electrical writing instrument wherein generator winding conductor lines may be formed by printed circuit techniques of the additive or subtractive types such as by masked vacuum deposition or by etching away most of a layer of conductive foil. As an alternative, instead of the lines being formed directly inside the socket walls of a ball point pen, they could be formed on an intermediate member such as a hollow insulation ball subsequently imbedded in the pen end socket.

Another object of the invention is to provide a self-contained magnetic recorder type of magnetic ball point pen. With the advent of miniaturized components and circuit systems it is possible to incorporate wire recorders, storage devices, computing devices and battery power supplies therefore directly inside a magnetic ball point pen casing. It is proposed that the pen contain a small battery of the hearing aid type and a small wire recorder with its spools removable through a hinged side of the pen. The electrical signals picked up by the magnetic ball windings are to be amplified by transistor circuits and directed to magnetic recording heads cooperating with magnetic material wire, filament or film wound in the wire recorder. In this case of the self-contained pen, the printed circuit techniques may be again resorted to in that the various solid state units may be deposited or imbedded in a thin flexible substrate and then the same could be rolled or coiled around the central capillary vial of ink for the ball tip pen. It is a feature of this self-contained construction that notes written in a classroom or at a meeting are readily interpreted magnetically later and automatically typed under control of the wire recorder taken out of the ball point pen. An advantage of the self-contained control type of pen is the absence of exterior trailing wires.

Another object of the invention is to provide a double-ended form of magnetic ball entry pen, wherein one end acts as a numerical input device and the other end acts as a recorder for recording totals and other accumulated amounts. In such a form of construction, the pen contains a decoder, a memory matrix, a calculator and a computer flash indicator as well as an output recorder at one end of the pen as distinguished from the input and which is a marking end used in the ordinary writing fashion at the same time that the numbers are entered for calculation. It is proposed that in such a calculating form of pen that the numerals entered are to be written in longhand or shorthand in the usual way, but an easier form for decoding would involve a style of numeric shorthand which would be directly representative of binary notation and so picked up by the storage mechanism and accumulating devices inside the pen.

Another object of the invention is to provide a writing instrument and a writing system best adapted to operate in a style of shorthand following authographic or alphabetic principles which lend themselves more directly to the purposes of direct typing or direct data input control. The present Pittman and Gregg shorthand systems operate on phonetic principles which are good for the purpose of speed with minimum marking. However, for the purposes of direct control over recording or accumulating it is believed advantageous to have a more definite association between symbols and controls to be exercised by such symbols. In an example of pen control of an electrical typewriter, it is deemed better for a shorthand system to simulate the combination control movements of the typing controls in order to make decoding of the system more direct.

Another object of the invention is the provision of an alternative form of writing control device in the form of a ball point pen wherein the principle of operation depends on sound effects rather than magnetic generating effects. In such a pen the ball is formed and shaped with one or more bands of differently serrated or roughened exterior as well as polarized magnetically for positioning purposes. Then, when writing is performed, the roughened portions in cooperation with fixed side wall roughness of different frequency bands inside the socket for the ball, causes varying sound effects to be generated in the pen. Such a pen also carries transducers, transistor detectors and amplifiers for converting the sound waves to electrical signals which may then be transmitted and decoded and used as input controls for typewriters, data processing systems, etc.

Another object of the invention is to incorporate addressing features into the magnetic ball point recorders of the invention. When a ball point wave generator is used, it is desirable to indicate the source of the input message as in the case of a retail establishment with many clerks, it is also useful to indicate a certain location or identity by department number, clerk number, item number, etc. In order to do this economically, it is sufficient to orient the generator coils inside the pen at a characteristic angle for separate identifications. Or alternatively, the winding lines may be varied in number and spacing to superimpose on the character signals, and generated waves of the writing signal, an extra different shape of the wave signal to indicate an address or identification.

Another object of the invention is to provide a nib point form of fountain pen construction wherein the ordinary nib pen point of ordinary shape is fitted within the nib slit with capacitive plates opposing each other at the end of the slot in the nib. Hereinbefore, it is noted that alternatives in the form of magnetic and sound effects ball point pens are set forth, and now here the alternative is for a varied construction of the ordinary nib point pen fitted with electrical control to provide output indications of writing. Then when writing is performed in a natural way the different directions of writing pressure and variations and the positions of the two nib points cause the capacitor plates to vary with regard to spacing about the dielectric ink or air space and so influence a circuit in which they are wired to affect variance of magnetic recording or other wave shape output manifestations subject to use by character recognition equipment. Instead of capacitive plates other expedients such as, induction coils or variable resistance relationships as by strain gauges on the pen nibs may also be substituted for the capacitor plates to yield similar results. More than one pair of nibs may be used in tip alignment for more sensitive indications of handwriting variations in pressure side to side and vertically.

Another feature of the invention is concerned with the nature of a document, digest sheet or charge plate upon which the magnetic ball point pen is operated as well as the construction of the magnetic pen per se. This deals with altering the object with which the pen cooperates in order to provide it with a form of groove or tracing over which the pen may be drawn silently and rapidly as in a groove formed with discrete roughened formations so that the ball of the pen is twisted and turned in a coded fashion for fast silent reception of data without the need for any thought or composition on the part of the pen operator. For example, in a library where it is not allowable to operate dictating machines or typewriters, it would be possible to trace silently over prearranged symbols or roughened spots or grooves by a self-contained recorder ball point pen and thereby form a coded magnetic record or alonghand or a shorthand version of an abstract, its origin, its title, etc., according to the need for detail. Then later the wire recorder may be taken out of the pen and control a typewriter at a school or business office. This is a quick silent method of retrieving information derived from a large source where silence is enforced. For such use, abstract cards or book sheets could have each line of characters repeated or underlined with shorthand symbols to be used as tracing controls for the pen wire recorder.

Of course, it is possible but more time consuming to make direct tracings of ordinary print or longhand copy and script and such ball magnet recordings would be of more general present usefulness as applicable to all books and papers now available. For major usefulness, a decoder could incorporate the virtues of both a typewriter and a facsimile device so that tracings of sketches, maps, drawings, diagrams, etc., could be reproduced as well as the reproduction of written matter. As another example, in department store accounting, recordings by a sales clerk could be hastened by use of the special pen in noting performances of sales recording and charge sales recording, all of which could be expedited by eliminating the tedious and time consuming handwriting notation of customer data and item data and instead have on each charge plate and each item price tag, a groove with roughened bottom and side spots to twist the ball of the ball point pen encode the entry of the same with one stroke to represent such customer and item data. An alternative mode of control would be to have such a straight long groove arranged with discrete magnetic spots encoded to influence the ball pen end with entry of such data. The object is to enter data with one quick straight stroke of the pen rather than through the ordinary vertical and horizontal motions of handwriting. Such expedited data may be digital, in binary code, or in any other code represented by different gyraitons of the magnetic ball and as different magnetic effects on the pen windings or Hall devices situated near the ball point pen end.

Another object of the invention is the provision of a special kind of shorthand to be a form of intermediary between the movements of a magnetic ball point pen and the controlled movements of a typewriter of the kind such as the IBM Selectric ball printing typewriter, wherein the typing ball is gyrated by code movements vertically, horizontally and rotatively. The kind of shorthand to be used establishes rapport between the movements of the pen and the combination control movements of the ball printer in the typewriter. The few movements required to turn and shift the printer ball of the typewriter may be assigned as the shorthand marking movements of the ball point pen so that a direct relationship is established for speed and economy of decoding which is to be set up between the shorthand marks of certain direction and length of movement, and the similar selection movement controls of a recording device such as the IBM Selectric ball printer.

Another object of the invention is concerned with an alternaitve to the magnetic ball point pen in the form of a sound effects recording pencil wherein a vertically striated lead has laminated layers of different lead hardness or roughness to produce different sounds for vertical strokes as distinguished from horizontal strokes and with the variations of sound in between to be representative of different characters by the emission of different series of sound wave shapes as characters are being formed in the act of handwriting. These sounds formed between the record and the scratching lead are carried to the inner lead end and there picked up by a microphone and amplified and recorded either inside or outside the pencil equipped with the electronic amplifying arrangement.

Another object of the invention is concerned with the use of a single Hall device or a plurality of the same as a magnetic sensing device adjacent the magnetic ball of a ball point pen of the kind discussed hereinbefore. While a plain sense winding as in a generator is productive of a generated electrical waveform output for useful results, a Hall device put next to a magnetic ball generator in a pen is also of great usefulness in that it has an electrical input as well as a magnetic input contributing to an electrical output. With a Hall device, dual controls may be exercised in any ball pen output operation. For example, as a pen is operated to form data, a separate electrical input to the pen and to the Hall device therein may carry an electrical input representative of a time code impulse train or wave shape to be superimposed on the data train, provision of an indication when, where or how an order was taken, a stock transaction authorized, etc. The factor of time is an important part of many transactions and it is thus superimposed on the transaction written, as it is being written. The foregoing illustration makes it clear that although the subject ball pen is ordinarily an input device or recording device of independent usefulness, by the use of a Hall device at the magnetic sensing area, the pen becomes receptive also of information, control, time, etc., as an input to an input device. These dual controls by the pen and outside the pen yield many combinations of manual plus manual control or manual plus automatic control for a realization of many forms of recording controls heretofore impossible. As an alternative to the mounting of a Hall device in a stationary fashion near the gyrating magnetic writing ball, the Hall device as a semiconductor plate may be mounted inside a non-conductive gyrating ball and then a magnetic field is provided by a stationary magnet with poles at opposite sides of the ball. Contacting probes are pressed on the ball lines to carry in and out the varying electrical signals generated in the gyrating Hall device.

Another object of the invention is to supply the ball point pen with a type of ink flaked with magnetic particles or magnetizable material so that as the ink is deposited in character shapes it will also have characteristic magnetic pattern formations like BITTER pattern or domain formations which are useful for magnetic pick up analysis aside from the visually useful character shapes as deposited by use of the ball pen as an input or recording device. In other words, the deposited ink is arranged to provide a novel magnetic as well as optical control in addition to the generating action of the magnetic ball to have its own control through the pen. The ink being so deposited in distinctive magnetic patterns is sensible and is of a form revealing personality traits of novelty and usefulness not taught in the prior art. The deposited magnetic patterns form a kind of magnetic fingerprinting which is distinctive for different human and automatic styles of operation.

Another object of the invention is to provide a dual device form of magnetic ball point pen in which a time indication or some other variety of information is superimposed on handwritten data. This involves a clock controlled instant time and data waveform generator for superimposition on data such as a written stock purchase order. As a magnetic real time analyzer, a pulse or waveform may be read out at regular intervals from a time piece and wired into the winding of the magnetic ball point pen generator to add time notation to a script address and other handwritten data. Instead of a clock form of auxiliary input equipment, a form of address or other identity introducing means may be wired to the pen and through such, a clerk's identity number, department number, etc., may be introduced by a generator serving to supply address data for superimposition on variable script data so that repetitive supply of instant fixed data is introduced along with the variable markings made by the operator in filling out various forms for department store work, stock purchasing, or inventory supply, etc.

Another object of the invention has to do with a self-checking pen of the kind involving a magnetic ball pen input to a self-contained calculator. This involves a checking counter inside the pen in the form of a small micro-electronic device, in which case the entire figuring or calculating mechanism is a small portable self-contained and manually operable unit. As an alternative, a counter could be accomplishing the checking function outside the pen and thereby would necessitate the provision of wiring leading from and to the pen. In either case, as a number is written by the pen, it is added in a counter which casts out a modulo number such as nine. This continues as number after number is listed and added until a long horizontal line is drawn beneath the entered numbers to separate the upper factors from the lower result. As such a line is drawn, a control is exercised in the pen and the factor sum in the counter is complemented and preparation for the addition of the check symbols of the result. After all the sum digits are marked a "9" should appear at a pen wall check counter window, or an equivalent sign given, indicating that the computation is correct. From the foregoing it is obvious that a form of writing instrument is involved in which the ordinary writing operation of forming numbers and digits provides a self-contained instrument wherein such numbers are checked so that the mental operation of performing the calculation and writing the result is attended by a checking operation to determine if the mental act was a correct one. In the prior art, checking devices are large automatic installations as distinguished from a self-contained manual writing insrtument such as the magnetic ball point pen of the present invention.

Another object of the invention is concerned with the provision of code conversion, checking and appending devices preferably coordinated with a self-contained magnetic ball point pen. This relates to checking an output delivery by appending to each numeral or character waveform, its binary equivalent, plus a check symbol for each digit or word. These extra binary and check symbols are introduced by code conversion means set up as the numerals are written by the pen, and then they are instantly read out of storage after each complete ball point spherically movement and appended to the decimal number waveform in the magnetic recorder. In the interval between the writing of one numeral and the next, or in the changing from alphabetical to numerical notation, code conversion takes place and also the generating of a check symbol. Such combinations are successively formed and generated signals may be delivered in a real time sequence with the output occurring instantaneously, or they may be stored and read out later. When such numbers are later transmitted and calculated, they are accompanied by double checks in the form of binary and check symbol notations.

Another object of the invention is the provision of a facsimile device wherein a transmitting magnetic ball point generator is rather directly connected to the follower receiver form of a recording device. It is noted hereinbefore that a form of facsimile device may be constructed by connecting the electrical output lines of a magnetic pen to a number of small motors and friction drive rods to operate the ball of a remote recording facsimile pen. What we are concerned with here is another advanced form of such a device to eliminate the separate motors at the receiving end. This is done by regarding the pen at the operating end as a generator and connecting the windings therein to the remote pen where the ball is regarded as a motor, and the windings around it are connected to the windings of the generating pen. Then, when the windings of the two pens are made to coincide in position, the generated current at the operating end is amplified and delivered to the receiving end where the windings operate the ball and the ball becomes a motor driven form of writing instrument. In other words, by the act of writing with a magnetic ball point pen with such a ball suspended in a field of windings, a series of generated fluctuations of current are sent through different windings and different output lines and these may be amplified and sent to a somewhat similar suspended inking ball, which has its own surrounding windings, which tend to activate it as an armature and thus cause reproduction of the writing of the source pen, imparted to the actuations of the remote pen.

Another object of the invention is to provide a combined form of sound reception equipment device as built into or onto a magnetic ball point pen inscription means, and thus combine sound and writing movement in the form of a teaching device. When a microphone is placed on the barrel of a magnetic ball point pen there is a combined vocal and written input which may be recorded within the pen or outside the pen on magnetic wire or tape so that there is a joint recording of sound and inscription. The output is a combined waveform of word sounded and word configuration combined at the same time and therefore there is generated a way of teaching language or other instruction. When such sounds and written inscriptions are reproduced while being watched by a student, they are especially useful in teaching shorthand, writing or foreign language instruction. For example, while writing words in English this may be accompanied by speech in a foreign language or, in the reverse, writing in a foreign language may be accompanied by speech in English. Then when a pupil listens and watches a facsimile transcription and sound reproduction of the same material, he is learning to read, write and speak it at the same time. These combined sound and configuration waveforms may be stored on the wire or tape within the pen and used later, or some direct output lines may be provided from the pen and carry along them the sound put into the microphone as well as the wave formations generated by writing so that as a certain word is written, the interpretation of it is sounded, and such combined signals may be sent out at the same time or later to be generated on a combined sound and facsimile shaping equipment suitable for display in separate student booths, or in the form of a type of closed circuit television wherein occupants of a classroom observe and hear the results.

Another object of the invention is to provide a magnetic recording form of magnetic ball point pen. In this device, the generated electrical waveforms are not only sent to storage or sent to remote stations outside the pen, but also brought around and made effective to make magnetic recordings on the ink deposited by the same pen as it is generating the same waveform signals. In order to do this, the end of the pen holding the ball is formed with a magnetic recording head and then the ball movements as they are operated to cause the ball flux to cut across winding lines and thus generate waveforms, is connected with an amplifying and decoding feedback arrangement to bring such waveforms or decodings thereof back to the magnetic recording head at the bottom of the pen where it rides over the ink just deposited by the pen. The construction involves an ink with a magnetic iron oxide particle or some other form of liquified magnetic material, and the part of the ball support end of the pen is formed with a slit in a magnetic head or concentric rings which are the pole pieces of a magnetic head. By means of this form of construction it is obvious that the ink when deposited forms an optical image by the shaping of numbers, letters, etc., and shortly after the time the ink is deposited there is formed thereon oriented and magnetic recording areas of polarized particles as controlled by the coded feedback of the waveform generator while it is forming the particular numbers or letters. The result is that the recorded symbols may be analyzed in a number of ways, i.e., visually, optically and by means of magnetic sensing devices. As the ball of the ball point pen is moved from left to right, it is not only generating the optical symbols, but in its wake, a magnetic recording is established in the ink as the flux across the magnetic pen head in the end of the pen travels across the ink previously deposited. A steady magnetic plate or pole piece may be provided underneath the surface of the recording material when needed to insure free flow of the ink particles and in order to counteract the magnetic field of the ball. The inked characters may be written over a mask of vertical slit openings so that when the striated lines are magnetized selectively with coded wide or narrow spacings, the magnetic code is in the form of the European CMC 7 code.

Another object of the invention is to provide means whereby the ball magnet pen operates as a measuring device and an impulse generator as well as the creator of electrical waveforms. Since the ball magnet may be oriented with respect to one or more windings, i.e., it could have its pole areas either perpendicular to, or at right angles to, a winding coil and thus in rotating in a truely right angular fashion, generate sine waves or steep impulse variations ascending in magnitude at regular intervals, in other words, provide spaced impulses. This form of arrangement is especially useful when the ball is made of a circumferential dimension equal to some graph line interval and thus it is representative of distance covered or a number of graph spaces traversed by ball roll movement, and also have numerical significance with regard to the distance the pen travels over a map, chart, diagram, drawing, etc.

One aspect of graph recording or shape depiction by facsimile requires some indication and transmission of a starting point on the graph, i.e., where a pen at a remote station is to initiate a traced figure or shape. For example, in the case of a weather map, where a cold front line is to be started around a high. One way to take care of this situation in the case of the use of a magnetic ball point pen is to preface the actual graph tracing with $x$ and $y$ dimensions which are created by pulses generated before the ball starts marking. For such uses, the ball itself is proportioned of a circumference equal to or a regular part of the graph division size. When the ball is so proportioned, then each rotation and each generated impulse is representative of travel over one graph division space. When the pen is about to create such preliminary $x$ and $y$ impulses representative of distance, the ink supply is selectively cut off and the pen is then started to be used as a spacing indicator starting from say the lower left hand corner of the chart and moving across horizontally for $x$ dimension and then vertically for a $y$ dimension. In sweeping across a chart from left to right with the pen, the pen ball in turning end over end, i.e., polarity *n s n s* etc., is made to generate a sine wave or impulse progression. The number of said impulses being equal to the graph's spaces traverse from a starting point, say the origin of the graph, or a corner of a chart. The $y$ ordinate spacing could be traced the same way, in a vertical direction or, simply by turning the pen 90° before vertical movement, to generate sine waves and pulses of another magnitude. The significant aspect of this graph use of the magnetic ball point pen is the versatility of the structure in being adapted to generate counting pulses and distance representing pulses as well as vector angular representations along with the capability of generating waveforms representative of different characters.

Another object is to provide means whereby the magnetic ball point pen and its generating pulses and waveform emissions are intimately and uniquely related to geometrical and mathematical problems. Heretofore, a writing instrument merely made signs, lines and curves representative of mathematical problems without entering into the solutions of them; such solution requiring mental treatment after which the recorder again entered the picture only as a way of making a durable note of the result. Now vector relationships, topology, calculus, matrix algebra and the like are entered into more intimately as to amounts, angles, areas and volumes with the pen forming solutions to problems as well as depicting them. The present data representing instrumentality is unique in its capability to handle, discrete, continuous and discontinuous functions of mathematical variables. The ball point wave generator is free to gyrate and represent by smooth electrical variations, curves of all types, continuous or discontinuous, and on the other hand, because the ball itself and its proportions may represent discrete units of space and can cause related emissions of pulses as well as waves, such pulses become discrete measures readily utilized for exacting digital processing. In other words, we have here analog and digital means rolled into one.

Another object of the invention is to provide an ink cut off means to be incorporated in a magnetic ball point recording instrument. Such a cut off may be employed to avoid marking on a graph while measuring or while creating a series of $x$ and $y$ impulses representative of a starting position for a graph shape. After the starting impulses for $x$ and $y$ dimensions have been generated, then the resumption of inking may be had by turning on the cut off mechanism which also could initiate the disablement of the counting means which actuated the up and over designating positions after which inking and shape inscription is to be reinitiated. Since each pen is equipped on the side with an orienting projection to indicate how it is to be held relative to the windings and the polarity of the ball magnet, such an indicator may also be used as a slidable wedge to actuate the ink cut off valve. Such a valve may include a lever with a soft rubber end to be pressed into the end of the ink flow tube to shut off the marker fluid when the pen is to be used for measuring or locating purposes prior to or subsequent to the usage in the regular way for marking characters and other figure shapes.

Another object of the invention is to provide means in association with a magnetic ball point pen whereby its marking movements are productive of music or speech sounds. It is noted hereinbefore how the gyrations of a magnetic ball are productive of electrical waveforms and how the ink spread thereby may be magnetically affected to be rendered sensible for representations other than visual or optical. Now it is to be noted that such waveforms or magnetic records are suited for sound production. Heretofore, the expressions "writing a speech or writing music" were phrases of a figurative sense when ordinary pencil and ink marking means were used. However, now that it is possible to make an electrical emission or magnetic recording by a ball point pen, it is possible to so control, move and shape such emissions and magnetic recordings so that when they are sensed and electrically or electronically transcribed, the outputs are speech sounds or music. Various arrangements of pen windings and coils and ball movements related thereto may be compiled as to resulting waveform output and the same compared with speech sound waveforms and music waveforms and a relationship established so that comparable waveform pen movements may be made to simulate the desired sound output. The magnetic ball flux may be directed against a fluctuating diaphragm for direct production of sound or such flux may be operative indirectly through magnetic recordings.

Another object of the invention is to provide a facsimile device wherein the sending scriber or recording instrument is free for manipulation. Many hand writing control devices of the prior art are in the category of captive styli which have drawbacks of linkage hindrances to free action, limited range and slow manipulation over special writing pads and grids which are handicaps avoided by the ball point magnet control of the present device which requires no special surface and no restrictions as size, shape or location of characters written.

Another object of the invention is the provision of a magnetic ball point pen wherein the casing of the pen is provided with adjustable facilities for controlling the initial orientation of the ball and also the arrangement of the windings cooperating therewith. When a bar magnet is arranged slidably vertically in the side of the pen casing, such a bar magnet has a number of uses, the first of which is to provide a magnetic arrangement for orienting the recording ball so that it always starts from an initial position. The second use of the bar magnet is as a projection on the casing of the pen so that a certain section of the pen is to be held upward between the thumb and the index finger so that a certain location is indicative of the proper way of holding the pen in order that the formation of characters has a certain relationship to the bar, ball magnet and the windings. A third feature of the bar magnet is the slidable nature of it, whereby it may be drawn back out of orienting position and then the ball is free to start in any position. Although windings are related to the area near the ball surface in order to be affected by the magnetic flux therefrom, they are usually thought of as removed 180° from the location of the bar magnet in order to avoid its influence. It is contemplated that the windings are to be mounted on an adjustable rotative or arcuate member so that the windings may be brought to different positions as desired. It is also contemplated that the windings need not be truly concentric with respect to the surface of the ball and this is done in order to have greater flux interception on the part of the slanted winding wires with respect to the flux generated by the moving magnetic ball.

Another object of the invention is the provision of a form of magnetic ball point facsimile device arranged with each pen having both sending and receiving instrumentalities in one casing. When such an arrangement is connected serially to remote stations, any one of the remote stations may act to provide a feedback and then the originating station will have a control pen which is a receiver along with the transmitter and a verification of the gyrations of the pen at the remote station is brought back to the originating location and thus, verified as to the nature of the transmission.

Another object of the invention is the provision of an inquiry station equipped with a data entering magnetic ball pen connected to a major data storage and computing center for information retrieval by handwritten inquiries. In the same manner that a telephone booth is now used for sound communication, usually with only one other person, the present pen station contemplates a coin controlled inquiry booth with a wide range of usefulness for detailed data and computation concerning many problems related to human experience. For example, inquiries regarding weather in a particular locality for a particular time, literature references, tax computations, first aid, stock market quotations, legal references, scientific data and computation, etc., may be made available by script or printed output reply for a nominal charge. Since the inquiry is written by a waveform generating instrument, it may upon payment of a charge, direct such an ordinary handwritten question directly into a large information retrieval system and receive a reply by routing answer signals to the same or a similar kind of generating instrument.

Another object of the invention is to provide a system of information recording service including a series of inquiry stations each provided with a marking ball point pen equipped to deliver electrical signals relating to the information written in ordinary handwriting style. These plurality of stations are connected with a central information retrieval and computing center where information such as weather reports, tax computations, shopping services, etc., are to be stored and made available automatically for any sort of inquiry written at the separate stations wherein each is supplied with a recording pen for direction to the central station as well as a recording pen or marking device for recording answers received from the central station. In other words, each of a series of information seeking centers is provided with both an output questioning writing device as well as a recording answering device, both of which are connected by a coin receiver for a charge as in the case of a telephone system where both input and output are related for a charge.

Another object of the invention is the provision of a sensing device for sensing marks on record forms, such marks being arranged in the CMC 7 code which is a code comprising seven marks spaced with wide and narrow intervals, such intervals being the code representative of the numeral or other character. In this instance, the recording instrument such as a ball point pen is equipped with devices for skipping and moving over the seven lines of the CMC 7 code and thereby detecting the narrow and wide intervals so that a code representation may be derived from the skip and start ball movements of the pen over the frictionally differentiated marks.

Another object of the invention is the provision of devices for marking in the CMC 7 code by means of a recording instrument which is both ink dispensing and magnetic in character. In the case of the use of a magnetic ball point pen, the rotation of the ball not only deposits ink through a mask comprising thirteen spaced slots which are to divide the recorded character into striations of magnetizable ink material, but also interpret the electrically generated waveform of the particular character and have that decoded so that when a magnetic head (on the pen or controlled thereby) is swept over the thirteen recording marked areas, such magnetizable mark areas are magnetized at intervals which are narrow or wide in order to represent the character in the CMC 7 code. In other words, a character is handwritten with magnetizable material over a dividing mask and then the same character is analyzed magnetically and decoded so that the head in sweeping over the thirteen recording marks, skips some of the marks and affects others of the marks magnetically so that there is formed a seven spaced interval of marks, some of which are widely spaced from each other and others of which are closely spaced, and between all of them there is a six interval code arrangement made representative of the CMC 7 code.

Another object of the invention is the provision of a diaphragm in a magnetic ball point pen wherein the diaphragm is situated near the magnetized ball so that in its movement to create a waveform, the diaphragm is affected to vibrate and create sounds related to the movements of the pen in making the characters which may represent information or vocal sounds or music.

Another object of the invention is to provide a magnetic recording instrument wherein there is a reversal of parts in that the ball of a ball point pen is not the permanent magnet device but instead is the winding carrying feature of the recording instrument. In this embodiment, a permanent bar magnet or horse shoe magnet is arranged on the lower end of the ball point pen and has poles oppositely arranged and extending towards the moving surface of the ball which is rotatably mounted at the point of the pen. In this instance, the ball is of ceramic insulation or hard plastic material such as nylon and on it, or embedded in it, are a series of winding conductive lines joined to provide circuit making facilities so that cooperating wiping contacts on the inside of the pen are connected to wires leading into the pen or out of the top end. Thus, the conductive lines on the ball not only act as means for generating current as they are gyrated and swept passed the intersecting magnetic flux lines at different angles, but the lines also act as a sort of slip ring for conducting the created electric waves into the stationary contacts and along wires to the top of the pen.

Another object of the invention is the provision of a ball recording instrument at a facsimile receiving station wherein the magnetic ball of the marking pen instrument is shaped with engraved or etched characters spaced in several circumferential lines to duplicate the recording ball of the IBM Selectric typewriter. Since in the present instance the ball is moved in synchronism with a recording input instrument, and the windings associated with the Selectric ball are energized to twist and turn it in agreement with the movement with the handwriting ball, the facsimile recorder is designed to position the ball so that a selected character is directly over a platen and recording sheet and since the pen may be suspended against a typewriter platen or from a magnetic overhead sheet which is holding the pen vertically and operated with vibration at the particular interval when recording is required, then it may impress character recordings either in inked form or without ink in a recording paper of the pressure influenced type.

From the objects noted it may be gathered that the ball tip is to have a structural attribute such as magnetic polarization, conductor lines, a semiconductor Hall plate, or roughened portions, providing the gyratory capability of producing unique patterns of output signals characteristic of particular writing motions. These novel attributes of the ball tip provide heterogeneity or variation in homogeneity of the ball structure and yet preserve its basic spheroidicity.

The foregoing and other objects, features and advantages of the invention will be apparent from the following and more particular description of the preferred embodiments of the invention as illustrated in the accompanying drawings.

Figure 1:
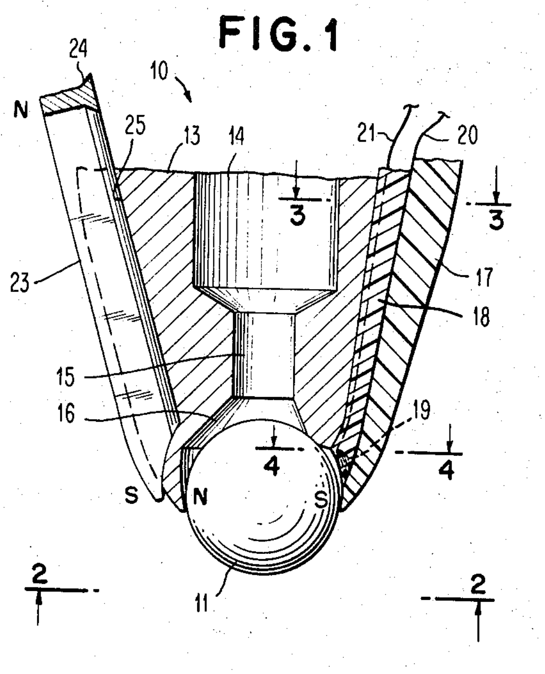
FIGURE 1 is an enlarged sectional detailed view showing the lower end of a magnetic ball point pen arranged with an orienting bar magnet and a printed conductor winding for conveying an electric waveform generated by the gyrations of the ball in marking handwritten characters in ink as directed by the ball.
Figure 4:
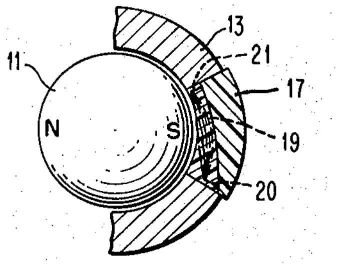

FIGURE 4 is a detailed sectional view taken along the line 4—4 in FIGURE 1 and showing the manner in which a printed circuit is formed on an inner surface of the outer plastic wedge so that the winding lines are delineated and suited to be sandwiched between the inner and outer arcuate plastic shapes and related to the nearby magnetic flux of the rotating ball which creates electrical waveforms in the winding wiring with extending wires reaching upward to the inside and the top of the pen.

Figure 4A:
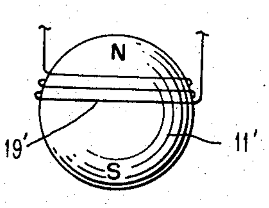

FIGURE 4*a* is an enlarged schematic view showing a winding as a helical generator coil around a magnetic writing ball.

Figure 5:
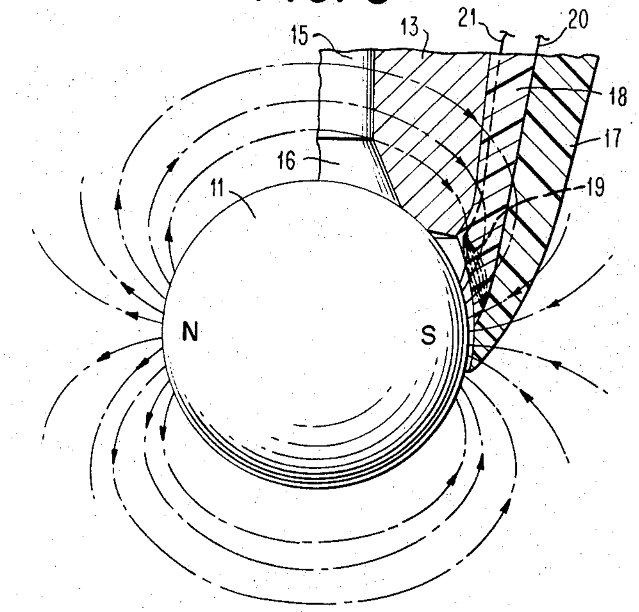

FIGURE 5 is a schematic showing of the manner in which the magnetic ball gyrates and carries along with it, its magnetic flux as in the case of a generator rotor magnet, and such flux in cutting across the winding lines, serves to create an electrical current therein and generate a waveform characteristic of the character being handwitten or printed by the gyrations of the ball.

Figure 5A:
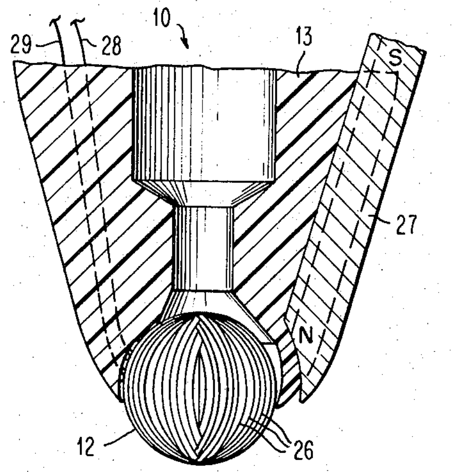

FIGURE 5*a* is a sectional enlarged detail view showing the lower end of a ball point pen wherein there is a reversal of parts regarding the generating functions of the ball. In this instance, the ball is no longer the magnetic element but instead is a plastic component containing the winding lines around its surface. Cooperating nearby the rotating ball is a bar magnet for creating the magnetic flux which is to influence the winding lines on the gyrating ball so that an electrical current is generated therein and carried away from them by riding contacts which cooperate with the winding lines as in the case of a slip ring formation. Said contacts have extending wires leading to the upper inside of the pen, or to the upper end and outwardly.

Figure 2:
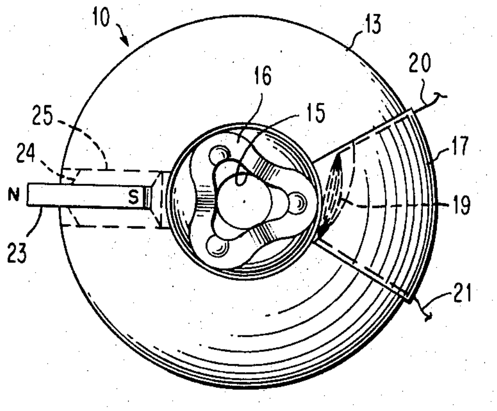
FIGURE 2 is a bottom view showing the lower end of the ball point pen with the ball removed.
Figures 5B, 6, 6A:
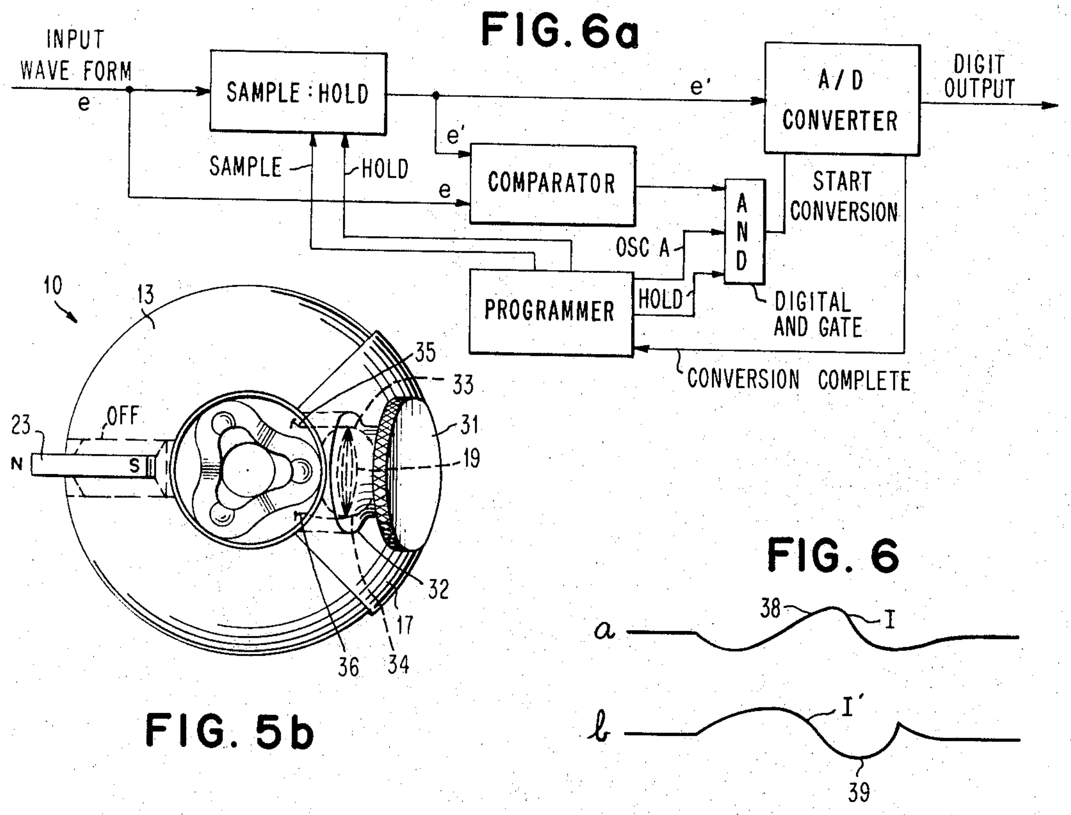

FIGURE 5*b* is a bottom view of the pen of the kind shown in FIGURES 1 and 2. However, this view differs from FIGURE 2 in that the generator coil or winding is adjustable, being mounted inside the end of an adjustable knob which is suited to rotate inside a contact member so that the angularity of the winding with respect to the ball may be changed to designate an address.

FIGURE 6 is a diagrammatic view showing how certain characters, when formed by the particular pen of the present invention, serve to generate electrical waveforms each of which is characteristic of its own numeral, letter or other character.

FIGURE 6*a* is a wiring diagram of electronic apparatus for converting analog electrical waveforms such as those of FIGURE 6 to a digital output usable by data processing machines.

Figure 7:
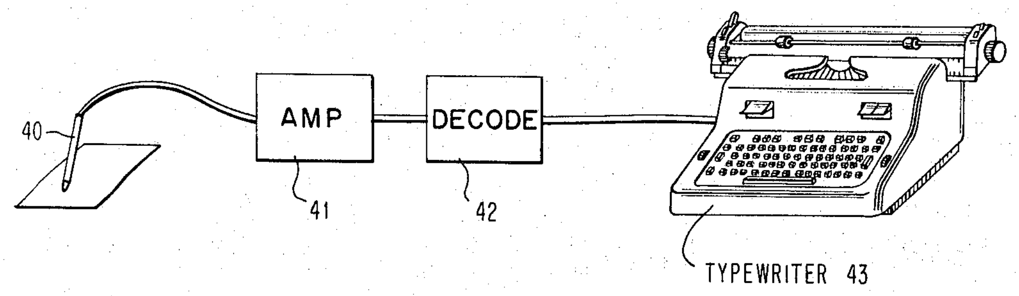

FIGURE 7 is a perspective view showing a system wherein a recording magnetic pen may be connected to amplifying and decoding means leading to a standard electric typewriter for coded action of machine recording while operating the pen manually in handwriting or printing.

Figure 8:
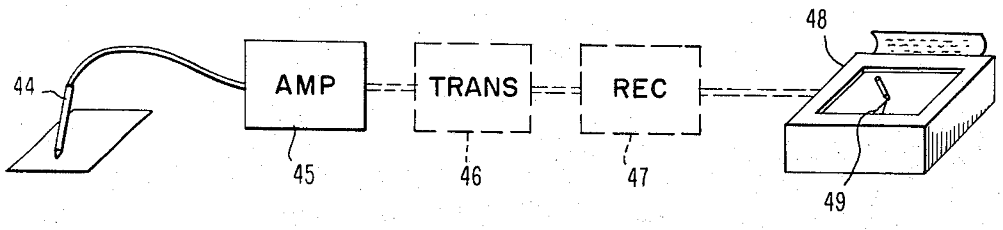

FIGURE 8 is a perspective view showing a system wherein a recording magnetic pen is connected to amplifying and transmitting means which rather directly control a remote receiver and a facsimile recording device which may or may not have a similar form of pen connected to move in synchronism with the movement of the ball as operated by handwriting.

Figure 9:
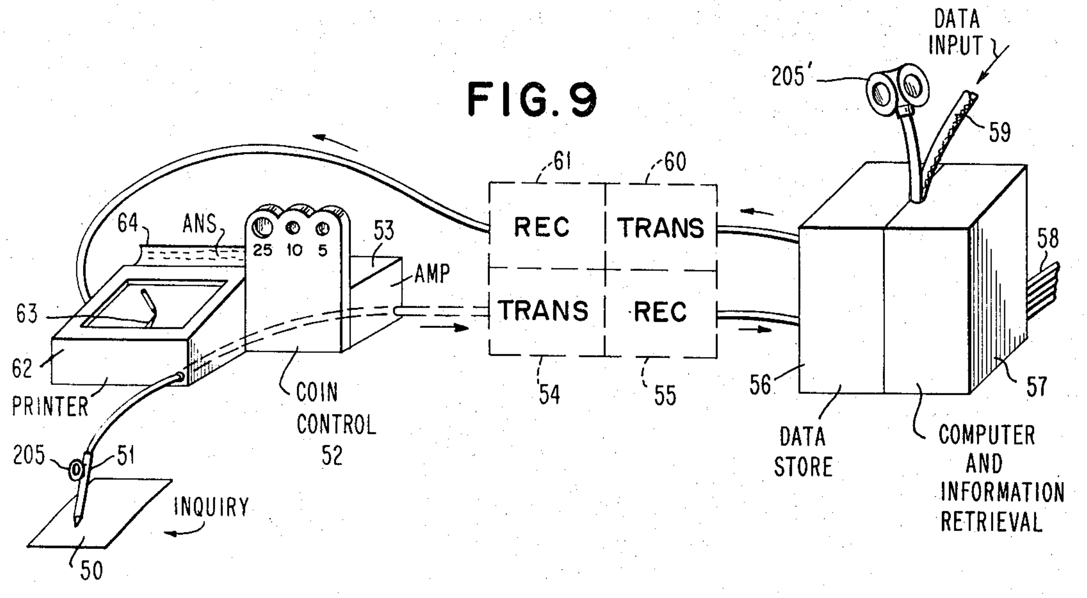

FIGURE 9 is a perspective view showing a system of a plurality of inquiry stations of the magnetic writing control variety for directing oral and written questions to a central data storage station which in turn re-transmits information to answer questions by printing and sounding answers at the station where the question originated. At each of these inquiry stations is one of the subject magnetic ball point pens for not only voicing and writing questions regarding any subject matter which is information in storage, but also transmitting such information in the form of electrical and radio waveforms as a generated control which is amplified and transmitted to a remote central station having a great store of information and computing capabilities so that answers may be formulated and sent back to the questioning station and there sounded and recorded on a printer. Such a printer may include a similar magnetic ball point recording pen for gyrating to formulate handwritten or printed answering information for which payment has been affected at the time the question was put to the central storage station. It is to be understood that there may be a large number of such inquiry stations connected to a large single central station and that a large number of component questions may be buffered by being stored and read out insequentially and directed back to the questioning station.

Figure 10:
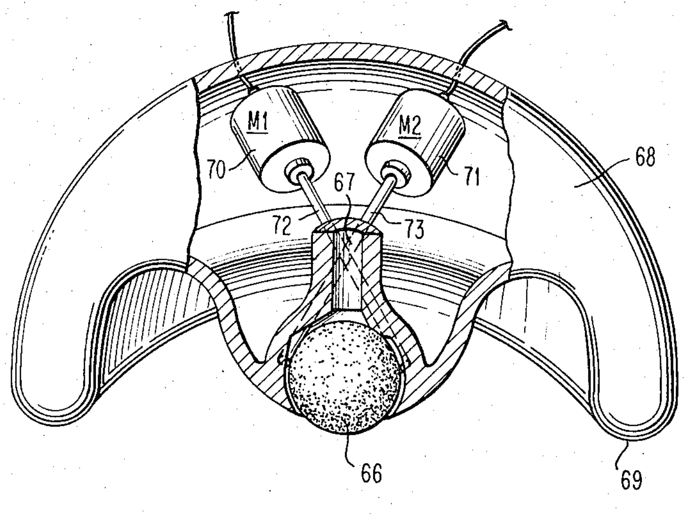

FIGURE 10 is a side elevation view partly in section showing a recording ball printing device wherein the amplified waveforms of a remote input station are carried into a plurality of angular driving motors for operating a recording ball to gyrate in synchronism with the originating station so that a form of facsimile recording may be affected.

Figure 11:
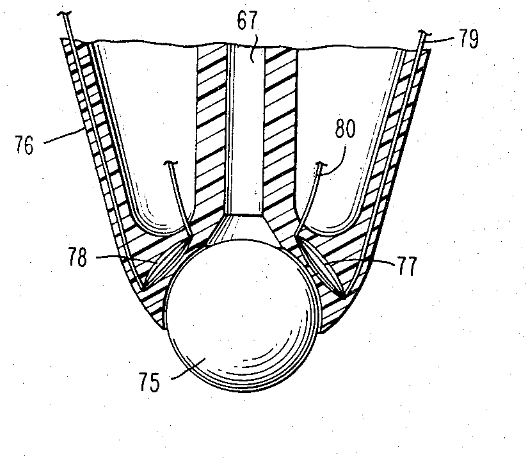

FIGURE 11 is a sectional detail view of another form of recording device wherein a ball point recording instrument is used, said ball being of magnetizable material and cooperating with windings which are energized from a remote station and used to drive the ball so that it is both a motor rotor and a recording medium for effecting motion in synchronism with some remote station wherein another ball is creating the discrete angular drive currents for driving the ball at this recording facsimile station.

Figure 11A:
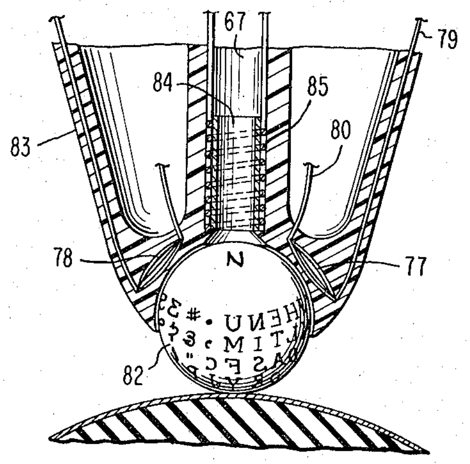

FIGURE 11*a* shows a sectional detail view of the lower end of a recording ball point pen wherein the ball is etched or embossed with the several circumferential lines of characters as arranged on the recording ball of the IBM Selectric typewriter so that when such a ball is electrically driven to a recording position there will be compatibility between it, an input control ball pen, and a recording typewriter which may be driven at the same time.

Figure 12:
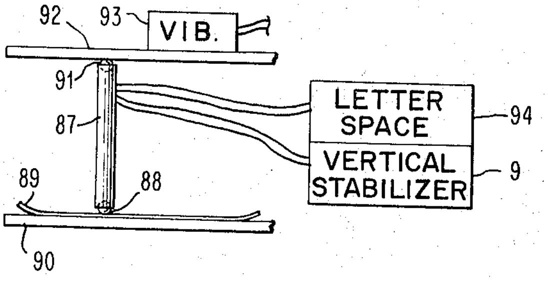

FIGURE 12 is a side elevation view showing a double ended ball point pen suspended between an upper magnetic plate and a lower recording paper sheet with the balls presumed to gyrate in unison and thus remain suspended vertically for recording purposes. Means are provided to vibrate the pen for recording, shift it for letter spacing and stabilize it to remain vertical. The upper magnetic plate may be stationary or operated to vibrate at print time in order to impress engraved characters such as those shown in the view FIGURE 11*a*.

Figures 13, 14, 15, 16:
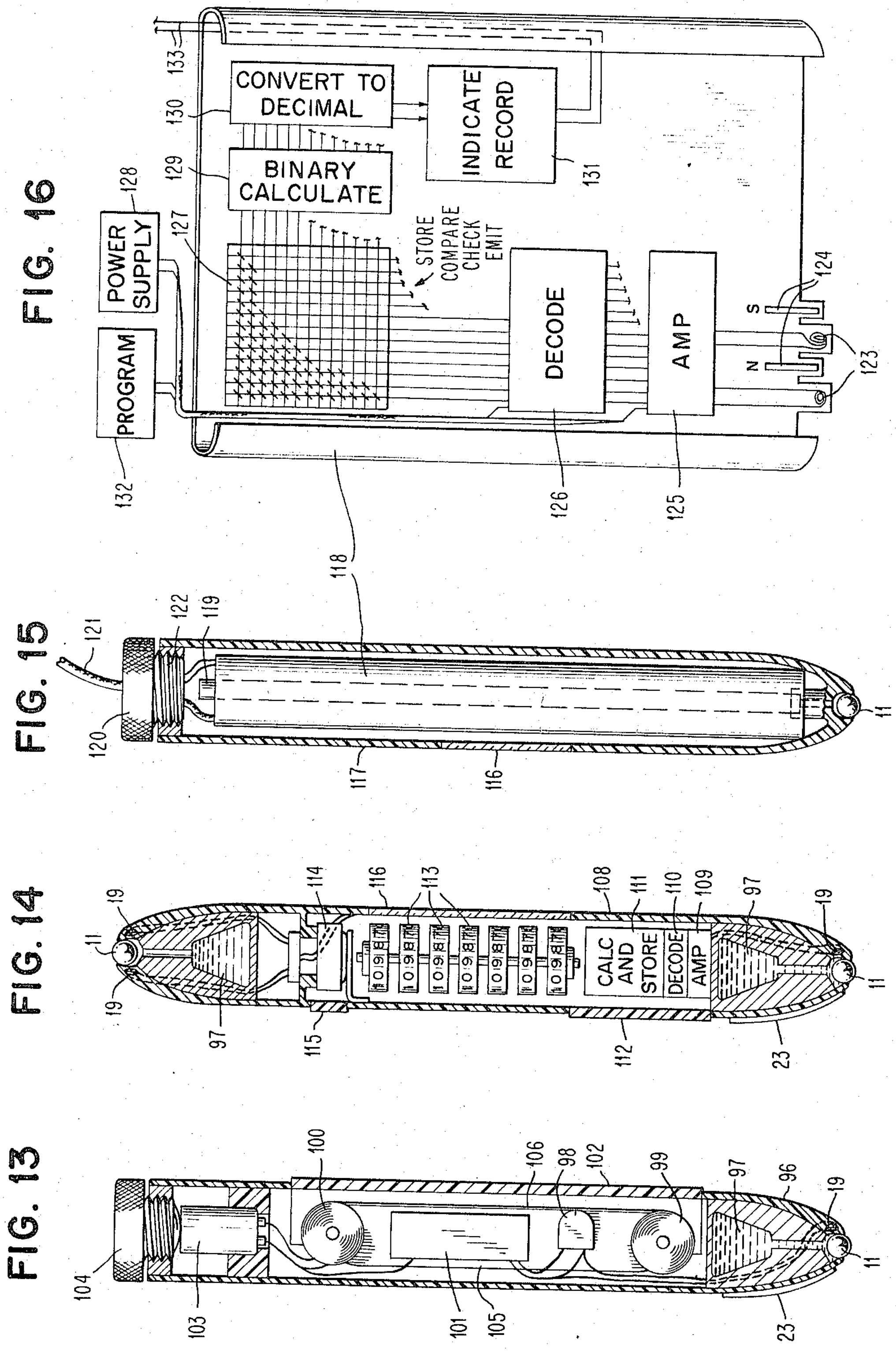

FIGURE 13 is a sectional elevation view of a magnetic ball point recording pen wherein the pen is self-sufficient, i.e., independent of trailing wires, since the electrical variations created by gyrations of the ball are stored magnetically on magnetic wire, with such a miniaturized wire recorder being encased directly inside the body of the pen.

FIGURE 14 shows a sectional elevation view of a double-ended magnetic ball point pen wherein the characters formed are presumed to be mainly numerical and such waveforms of magnetic numeric representation are to be amplified, decoded, stored and calculated and at times shown on a flash indicator of a photoluminescent type on wheels having indicating numerals showing the results of a calculation. The same storing and calculating devices may be used to have an effect on the recording ball at the upper opposite end of the pen so that if the pen is turned around and arranged as shown in FIGURE 12, it may effect an output recording of the input factors entered and the sums calculated at the opposite end of the pen.

FIGURE 15 shows a side elevation view of a magnetic ball point pen of the kind wherein entered data control and storage is effected by a spirally arranged form of flexible printed circuit. Such a spiral sheet is slipped around the capillary inking tube.

FIGURE 16 is a plan view of an unrolled form of flexible printed integrated circuit wherein many solid state devices and connecting wires may be formed on a thin piece of insulation material by any of several well known printed circuit processes. The idea being to hold thereon not only the orienting and generating magnetic devices of the magnetic ball point pen, but also lead the electrical impulses therefrom and waveforms into amplifiers and decoders and storage, calculating and indicating instrumentalities all formulated on one thin piece of insulation which is so flexible that it may be rolled in a spiral and assembled around the central ink font of the pen as shown in FIGURE 15.

Figure 17:
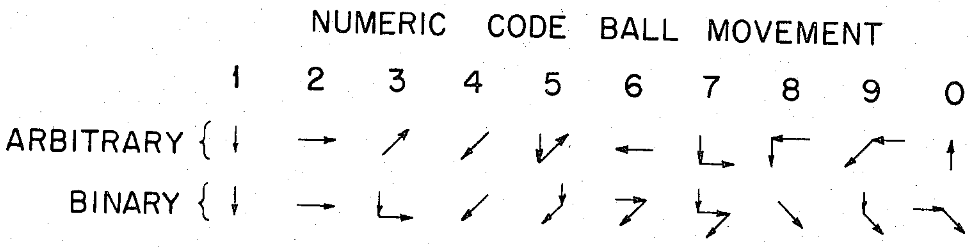

FIGURE 17 is a diagrammatic view showing how the code ball movements may be designated in an arbitrary fashion to have certain movements related to certain numerals or other characters. As a variation of this, the movements mave have more orderly significance in the form of a binary code as shown in the lower part of the view.

Figure 18:
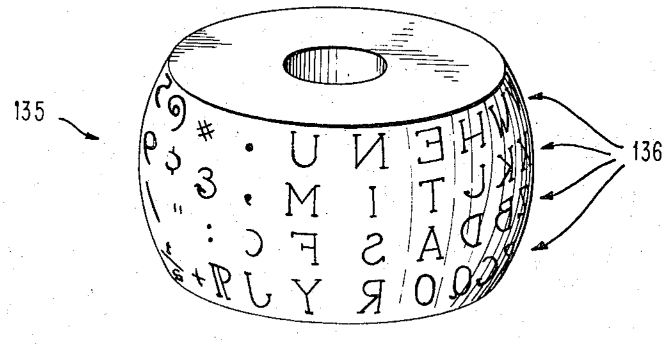

FIGURE 18 is a perspective view of the Selectric ball used in the IBM typewriter. Said ball having four circumferential lines of characters, and the characters being arranged in 22 columns.

Figure 19:
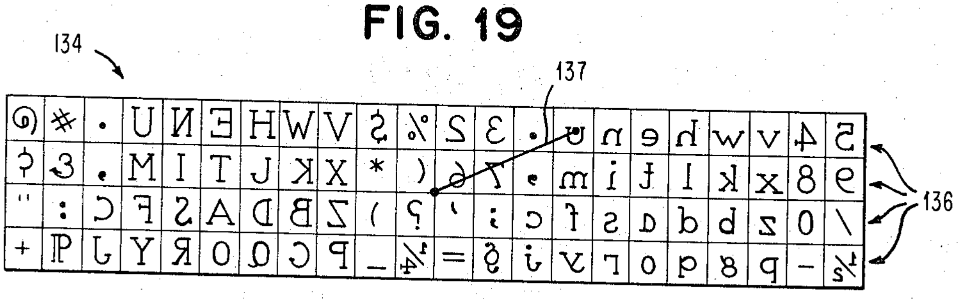

FIGURE 19 is a diagrammatic view of a code showing ball magnet pen movements which are compatible with the arrangement of the characters shown on the Selectric ball. This is done in order that the control of the pen over the typewriter may be effected without requiring much intervening control mechanisms because the movements of the pen are designed to cause direct movement of the typing ball as noted in FIGURE 11*a*.

Figure 20:
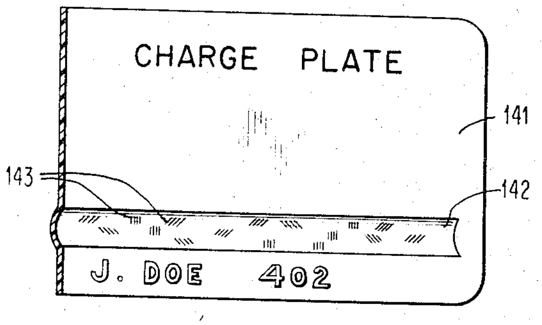

FIGURE 20 is a plan view of a charge plate showing a groove therein formed with areas of roughness to twist and turn the ball of a magnetic ball point pen so that its gyrations conform with the code or direct name, number, address, etc., of the patron.

Figure 20A:
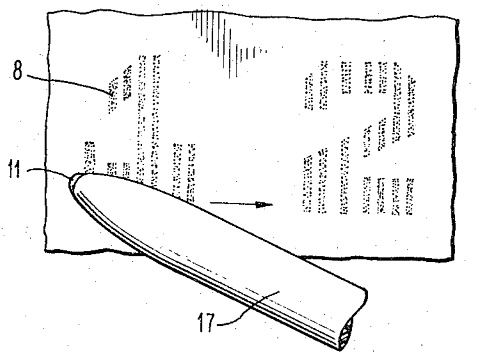

FIGURE 20*a* is a diagrammatic perspective view showing the formation of a pair of numerals in the CMC 7 code, such markings being of frictional and magnetic material so that a pen ball is twisted at selective intervals over wide and narrow spaces to yield an output in the CMC 7 code when the pen is drawn horizontally across the lines making up the code characters.

Figure 21:
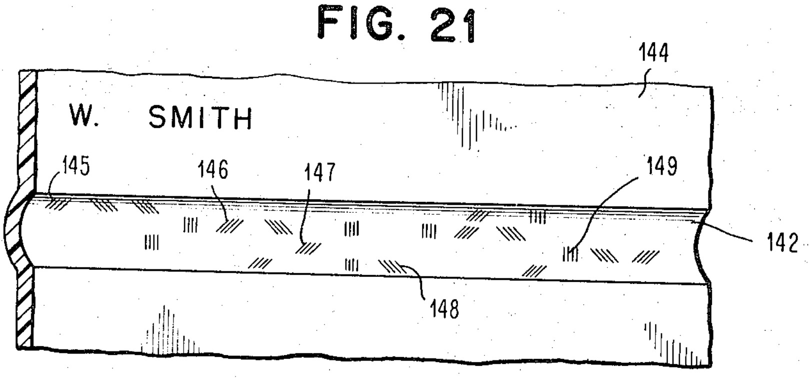

FIGURE 21 is a plan view showing a document with an enlarged groove formed with the frictional areas in four different lines of spacing and at different angles in order to gyrate the ball of a sweeping magnetic ball point pen so that the output is representative of desired information.

Figure 22:
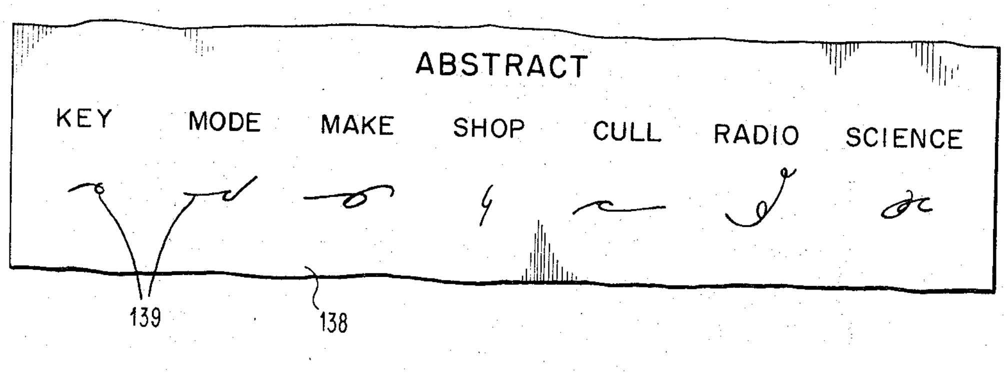

FIGURE 22 is a plan view showing a printed sheet wherein an abstract of an article is not only printed in alphabetical characters but also in Gregg shorthand, which may be traced by a magnetic ball point pen and thereby generate waves characteristic of the Gregg shorthand characters and formulate waveforms characteristic of a word. Such shorthand strokes may be of magnetic material and magnetized discretely to affect a sweeping ball near a diaphragm to produce sound as a vocal presentation.

Figure 23:
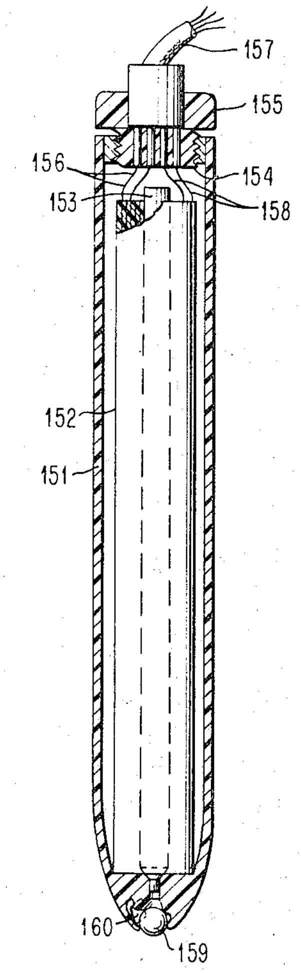

FIGURE 23 is a sectional elevation view of a magnetic ball point pen wherein the control circuitry is wound centrally in spiral and at the lower end there is arranged a Hall device, said pen not only having output lines but also input control lines because the nature of the Hall device submits to outer electrical control as well as the magnetic control of the gyrating ball.

Figure 24:
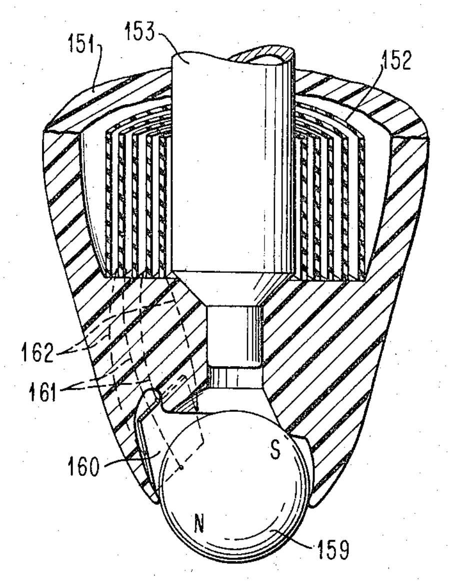

FIGURE 24 is an enlarged detailed sectional view of the lower end of the pen shown in FIGURE 23 wherein the Hall device is shown as a plate related rather closely to the magnetic flux generated by the gyrating ball.

Figures 25, 25A:
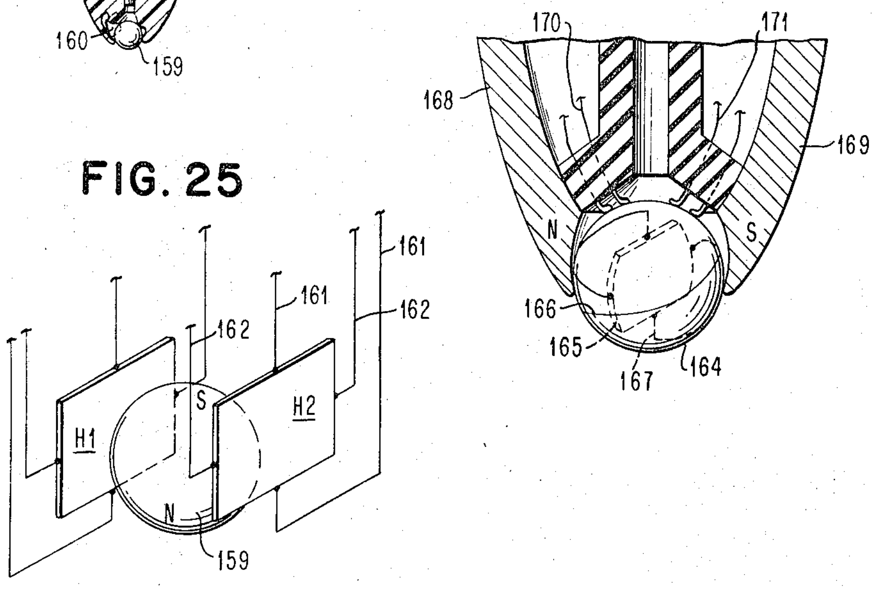

FIGURE 25 is a diagrammatic view showing how a pair of Hall devices may be related to the centrally gyrating magnetized ball which when moved to form characters has varying magnetic effects on the two Hall devices which in turn have varying electrical effects created externally as well as internally by the joint action of the gyrating ball.

FIGURE 25*a* is an enlarged detail sectional view of the lower end of a ball pen which is an alternative form of the Hall device pen of FIGURE 24. This modification places the Hall semiconductor plate inside a non-magnetic ball and between stationary magnetic pole pieces.

Figure 26:
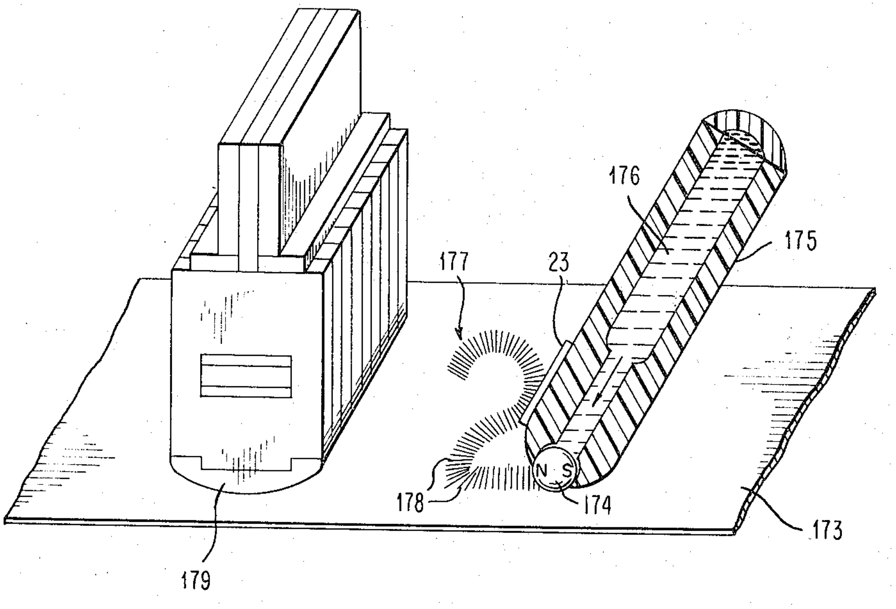

FIGURE 26 is a perspective view showing a magnetic ball point pen carrying an ink which is provided with magnetic or magnetizable particles so that when deposited, the character is formed with ink which has orientations of its magnetized material. Characters may be sensed by a magnetic head after being deposited, and thus the operation of sensing may be carried out independently of the pen once the character has been deposited.

Figure 26A:
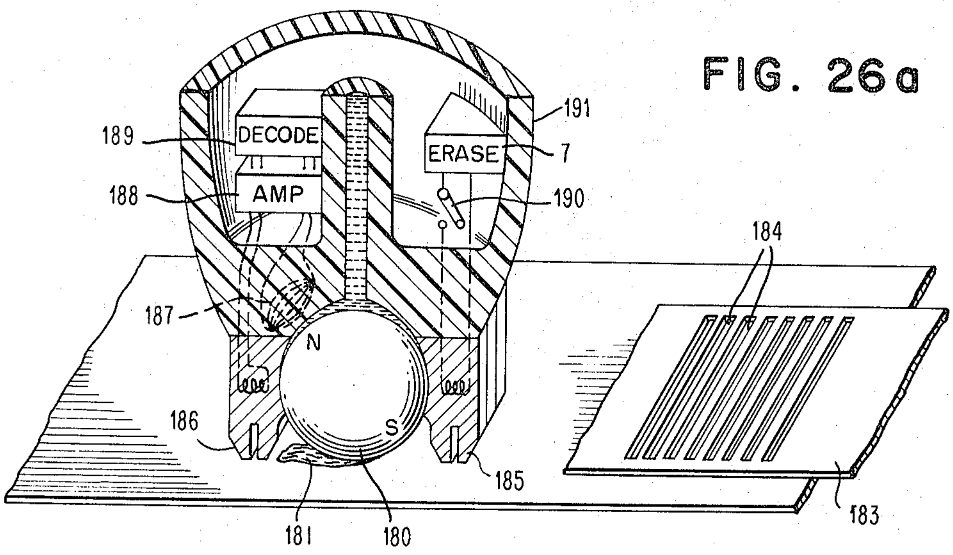

FIGURE 26*a* is a detailed sectional elevation view partly in perspective showing the lower end of a magnetic ball point pen wherein the pen structure is additionally formulated with erasing and recording heads alongside the ball mount. The recording heads alongside the gyrating ball are suited for erasure, sensing and recording. On the left, the output waveform of the gyrating ball is amplified and decoded so that it may be superimposed in magnetic code on the recording fluid deposited previously by the ball. At the right of the view is shown a mask for providing 13 slots so that the character recorded may be divided into inked areas to be magnetically treated in a CMC 7 code after it is formulated by being hand printed by means of the inked ball operation.

Figure 27:
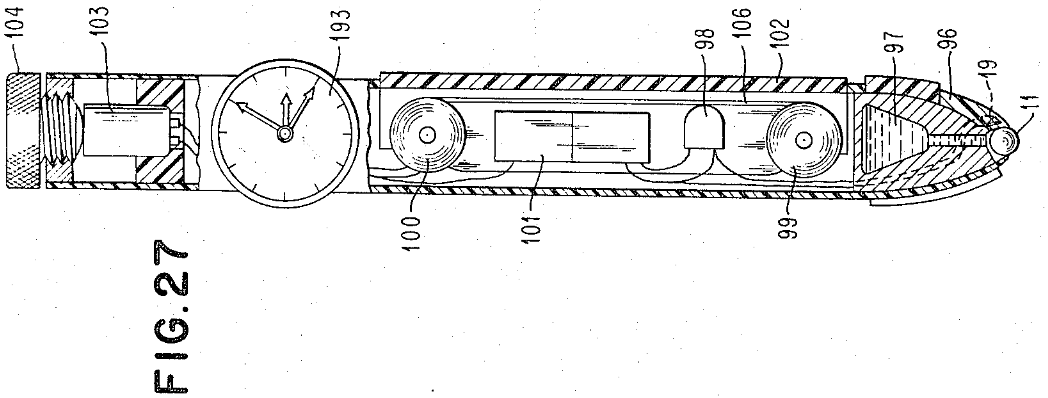

FIGURE 27 is a side elevation view partly in section showing a magnetic ball point pen which not only carries a wire recorder but also a timing mechanism which is suited to superimpose or accompany time signals with recorded signals of whatever is written.

Figure 28:
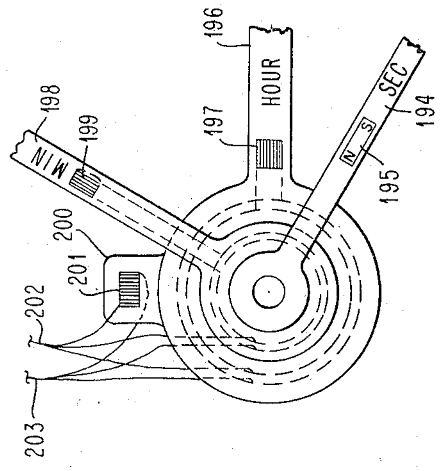

FIGURE 28 is a detailed plan view showing the essential portions of a timing mechanism wherein the sweeping second hand carries a permanent magnet which when sweeping past coils of a reference point, hour and minute hands, creates intervals or pulses of magnetic flux movements and corresponding electrical waveforms which are coordinated with the character waveforms of the gyrating ball point pen so that a composite recording is made of information and the time that the information is entered.

Figure 29:
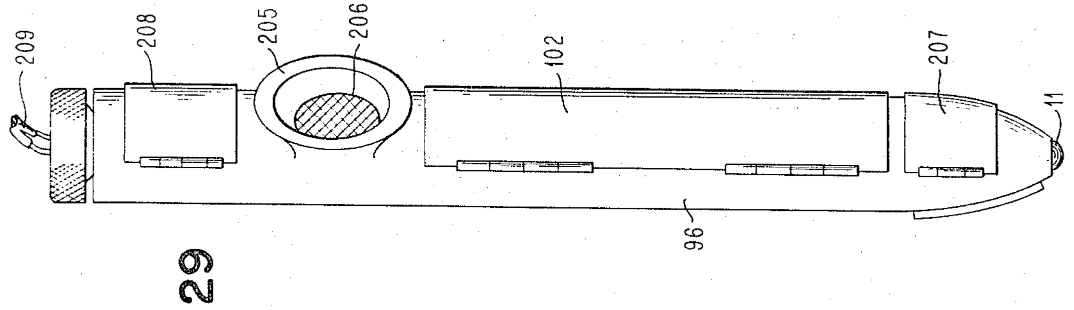

FIGURE 29 is an elevation view of the side of a magnetic ball point pen carrying, in addition to the features mentioned previously, a composite microphone and speaker for generating vocal controlled electrical waveforms for coordination with written handwriting electrical waveforms so that a composite recording or output may be made of, for example, writing in one language and vocal transmission in another language.

Figures 30, 30A:
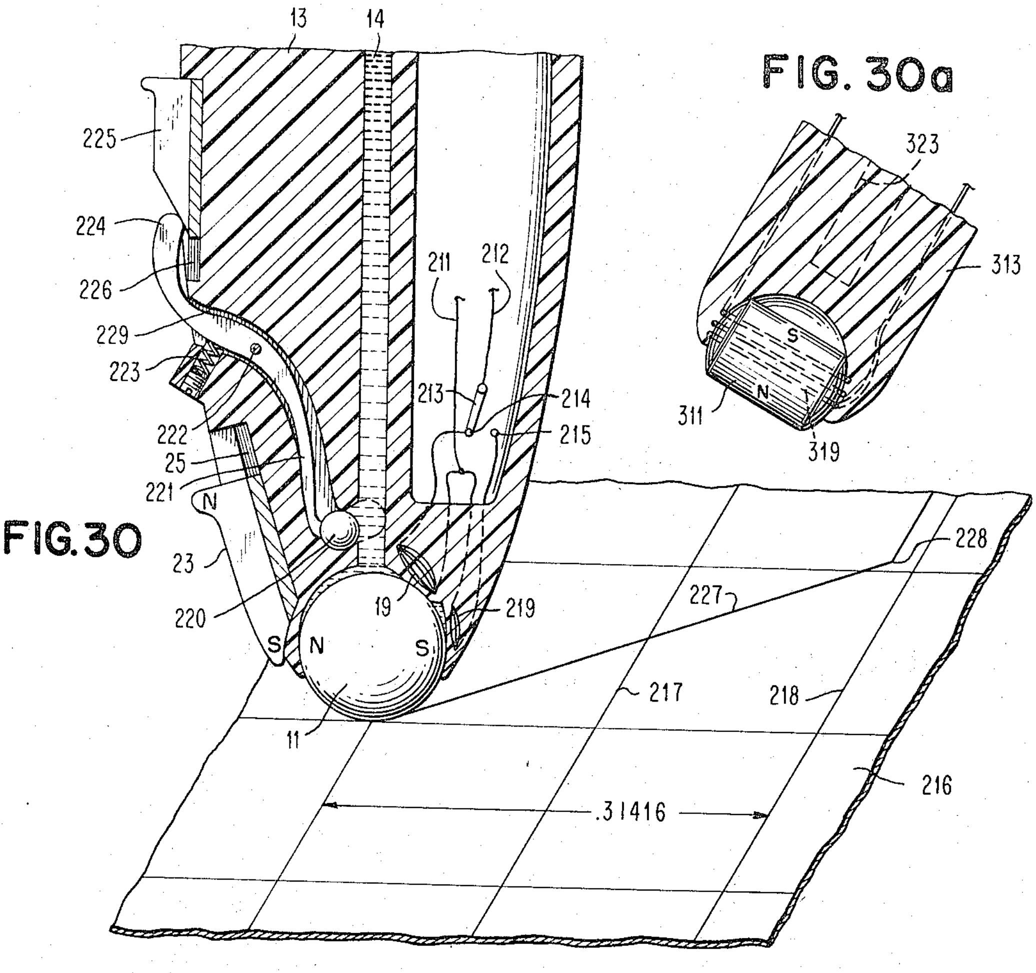

FIGURE 30 is an enlarged sectional detailed view of the lower end of a magnetic ball point pen arranged to operate in a pulse mode as well as in the wave signal mode mentioned hereinbefore. When a winding is related to the ball so that the magnetic flux is directed into the winding at regular intervals as when the ball is turned end over end, then it is operated pulsatingly to be representative of distance and space travelled by the ball the circumference of which is related to a chart or a map division. As an alternative to the pulse mode, the waveform mode allows the ball to rotate or gyrate in prescribed directions to formulate the waveforms characteristic of a character shape. Since the pulse mode is usually operated without the need for recording ink, FIGURE 30 shows the means for stopping the ink flow so that the ball is gyrated then not so much as a recording instrumentality, but rather as a digital measurement control device for generating digital signals.

FIGURE 30*a* is a detailed pen end view showing a cylindrical roller useful for pulse mode entries.

Figure 31:
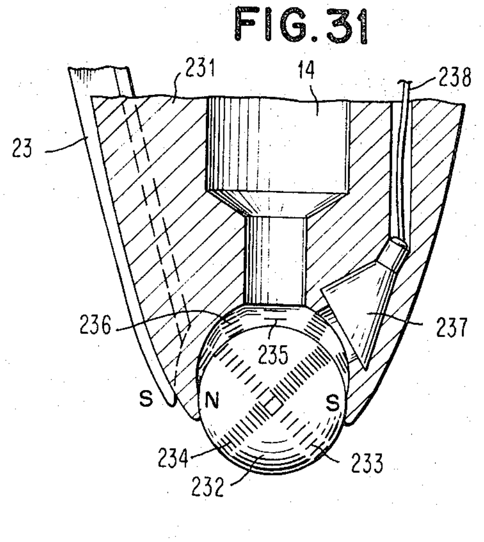

FIGURE 31 is a detailed sectional elevation view of a form of magnetic ball point pen wherein the ball surface is formed with regular areas or bands of friction indentations or extensions of a frictional nature to cooperate with similar bands or areas of friction indented inside the wall of the socket with which the ball cooperates. In this way, the traverse of the areas of friction cause varying sound effects which are picked up by a microphone and carried by electrical wiring to either the inside recorder or out of the pen. In FIGURE 31 the sound effects are independent of the magnetic characteristics of the ball but they also are representative of different characters by different sounds.

Figure 31A:
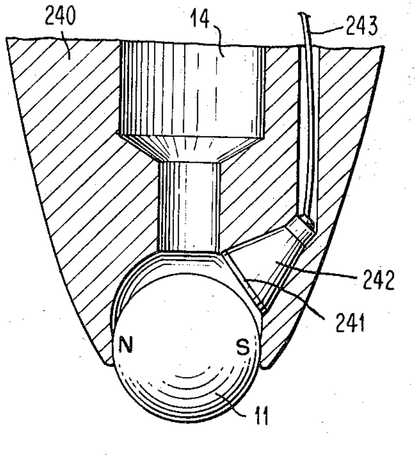

FIGURE 31*a* is a detailed enlarged end of the lower end of the magnetic ball point pen showing a diaphragm form of sound recorder or pick-up device assembled near the magnetic ball. In this embodiment the gyrations of the ball and the magnetic flux thereof are directly related to the sound effects caused by movement of the diaphragm. In this way it is a more direct sound effects device than that of the showing in FIGURE 31.

Figure 32:
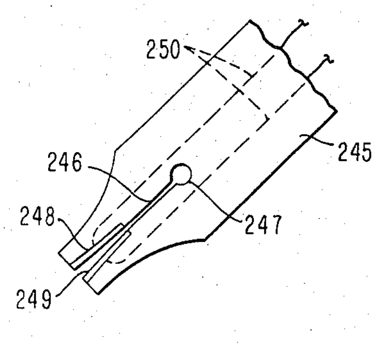

FIGURE 32 is a perspective view of an alternative embodiment using a nib form of fountain pen as an alternative to the ball point pen. The nibs of the pen are formed with capacitor plates so that in the formation of characters, the plates are sequentially widened and drawn closer together as a character is written. A capacitance sensitive circuit is connected to create and decode representative electrical waveforms.

Figure 33:
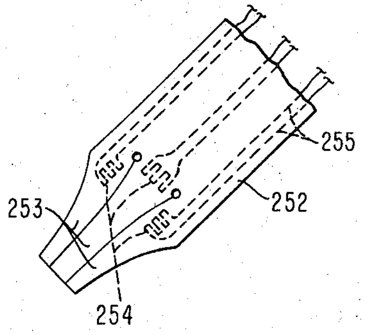

FIGURE 33 is a perspective view of another alternative embodiment wherein a nib form of pen is constructed with three lower end flexible nib points, each of which is provided with a variable resistance strain gauge showing the directions of pressure on the nibs as various characters are formed by vertical or horizontal strokes or a combination of the two.

Figure 34:
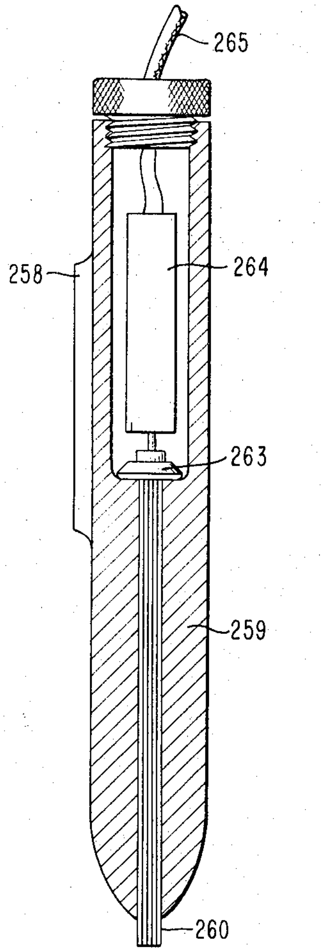

FIGURE 34 is a side sectional view of an alternative form of pencil as contrasted to the inking devices previously mentioned. In this alternative form, the pencil is composed of striated lead having alternating streaks or areas of hard and soft leads which when drawn over paper will cause varying sound effects according to the horizontal and vertical components of a character drawn. The interior of the pen is provided with a microphone and amplifying and other electrical conveying devices to make recordings or transmissions of the electrical waveforms created by the sound effects caused by the different scratching movements of the pencil lead.

Figure 35:
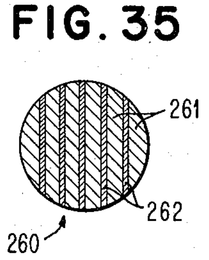

FIGURE 35 is a sectional detailed view showing the alternating arrangements of the lead used in the pencil of FIGURE 34.

The description may be summarized by noting that the invention relates to an unrestrained form of stylus character entry device. The device is unrestrained to the extent that no special base or matrix is required over which printing must be effected for character recognition as is so often found in the prior art. Instead, here, ordinary handwriting movements may be used over ordinary paper with no special backing or constraints required. All this is made possible because a pen of special form such as a magnetic ball point pen is equipped to perform magnetically and electrically as a generator of pulses and waveform electrical variations representative of ordinary character writing movements, and also of map, chart or graph, linear, curvilinear and solid geometric depictions. When the ball of a ball point pen is formed as a permanent magnet and a coil or winding of conductors is associated therewith, the movements of the ball in forming characters and covering spaces, shifts the magnetic flux therefrom in regular or irregular patterns and induces minute but distinctive waves of electrical current to flow in the coil and be subject to transmission for amplification, decoding and utilization.

Turning to FIGURE 1, we note that view 10 represents an enlarged end of a ball point pen. The inside of the pen barrel 13 is formed in the usual fashion with an enlarged inner ink vial or capillary container 14, a constricted passage for the ink near the lower end 15 and a number of orifice openings 16 for distributing the descending ink around the upper surface of the ball 11.

Examples of ordinary ball point fountain pen structures may be noted in U.S. Patents 2,390,636, 2,400,679, 2,428,854 and 2,491,082 and others of U.S. patent class 120—42.4. Ink therefore is generally of the kind found in class 106—33 as illustrated by U.S. Patent 2,684,909.

When the ink is to be of the magnetic variety it is generally of the kind set forth in U.S. patent class 340—174.1 and represented by IBM Patent 3,072,577.

In the present instance, the ball 11 is of special magnetic material such as a hard magnetic alloy to form a permanent magnet with great flux emitting capabilities relative to its size. The magnetic alloy may be of the alnico type of ternary alloy including aluminum, iron and nickel with the addition of various amounts of copper, cobalt, titanium, niobium, etc., as well as of various orienting treatments to increase the value of the BH ratio to be obtained in the order of $10^8$ gauss oersteds.

The material of ball 11 is important to attain good magnetic qualities, but the treatment of the material in order to orient the particles constituting it also performs a valuable function, and one form of it may be accular particles oriented and compacted and sintered to form a highly directive creator of magnetic flux. For the ordinary use of such a ball, it is desirable that it should have a certain amount of frictional exterior characteristics so that it does not skip but, in some of the instances to be related hereinafter, the object is to have the ball skip over some intervals but be carried in its usual gyrating arrangements by the frictional characteristics of the writing material as well as the frictional characteristics of the magnetic material from which it is constituted.

As shown in FIGURE 1, the ball 11 is shown to have its north and south poles and axis situated left and right respectively. This may be assumed to be a home position which is assumed every time the pen is lifted. The ball is caused to return to such a position by the urging of a bar magnet 23 which is understood to be either just soft iron or be formed of a magnetic material such as that already described as suitable for the ball 11. However, the attraction of bar 23 must never be too strong such as to frustrate the free writing movements of the ball, hence magnetization is tailored to the need. Bar magnet 23 is formed with a dove-tailed inner face 24 by means of which it is keyed into the non-magnetic barrel material 13 of the end of the ball point pen. Although the bar magnet 23 usually assumes a position wherein the lower south pole end is near the bottom of the pen and directly opposite to the home position north pole side of the ball 11, it is made to be withdrawn upwardly and held out of the range of influence over the ball 11 should such a mode of free unrestored gyration of the ball 11 be desired for some form of depiction. However, ordinarily the bar magnet 23 is in the lowered stationary position wherein its south pole influences the ball 11 to return to the position shown whenever the instrument is lifted above the paper.

Although in FIGURE 1 only one such bar magnet 23 is shown and only a single coil 19 is shown, it is obvious that a plurality of both may be distributed around the upper perimeter of the ball to exert greater restoration power and a greater amount of generating and pick-up coilage as in FIG. 4*a*, should such constructions be desired. In the case of the bar magnet, it may be bent in the form of a horseshoe so that parts of it are opposite both poles of the ball 11 and in such cases, the generating coils 19 would be distributed differently in the areas not occupied by the poles of the orienting bar or horseshoe magnet.

FIGURES 2 to 5 show the manner in which a sandwich of plastic or ceramic segments 17 and 18 are embedded in the right side of the pen barrel 13 and there used to hold in place a coil 19 of wire or thin printed circuit conductors placed near the outer surface of ball 11 so that the lines of magnetic flux therefrom cut across the wires 19 and are used to generate electrical currents in the wires to be conveyed upwardly into and out of the pen. The diagrammatic view of FIGURE 5 shows how the wires 19 of the coil are situated so that as the ball gyrates, the magnetic flux therefrom causes waveform arrangements of electrical distribution to be directed into the wires 19 and be conveyed through the leads 20 and 21 to be sent to amplifying and utilization devices.

Although the word "coil" is used rather loosely as directed to strands 19, it will be understood that the showing is minimized for clarity and that such strands 19 may be multiplied and arranged as coils around the ball 11 horizontally, or multiplied in several arrays, in all instances trying to have more conductors cut by greater amounts of magnetic flux in order to gather as intense an electrical current as possible considering the confined quarters at the end of a ball point pen. However, many of the pen parts may be enlarged for this special purpose.

Although, as shown in FIGURE 1, there is a direct relationship between the ball 11 and coil 19, it is contemplated that there could be advantages in increasing the speed of movement of the ball flux relative to the coil and this could be attained by having a larger, outer abrasive plastic ball 11 driving a small fast offset magnetic ball as the inner generator operating in conjunction with a coil 19.

Figure 3:
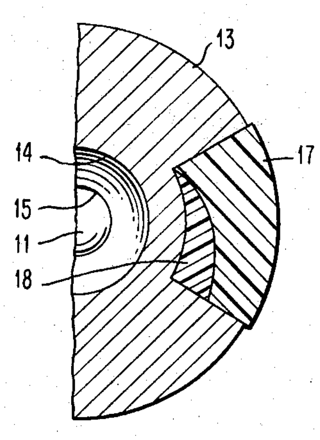
FIGURE 3 is a detailed sectional view taken along line 3—3 in FIGURE 1 and showing the manner in which plastic inserts are assembled onto the brass outer shell of the lower end of the ball point pen in order to carry the winding lines or wires as a printed circuit on the plastic.

Turning back to the mode of construction of the plastic sandwich 17 and 18, it may be noted from FIGURE 3, the sectional view, that the pair of plastic elements are assembled as a segmental shape and adhesively secured to an indentation along the outer wall of the barrel 13. These two plastic parts 17 and 18 descend to the point directly opposite the south pole of the magnetic ball 11. There they confine the strands of coil 19 and the leads 20 and 21 extending upwardly therefrom. These conductors or fine wires 19, 20 and 21 may be formed as printed circuit lines on one or the other of the plastic parts 17 and 18, and it may be assumed that they are etched out of a foil adhering to the inner surface of the arcuate member 17. If not etched from copper foil, it may be assumed that they are conductive wires embedded in the plastic surface and that the other plastic member 18 is used as a cover for protection and to hold the strands in position directly opposite the gyrating surface of the magnetic ball 11. FIGURES 2, 4 and 5 show that the strands 19 are deliberately slanted outwardly so that one end is closer to the ball than the other end and this is done in an effort to have more lines of flux cut across the strands of wire.

It is noted that the bar magnet 23 as well as the plastic segment 17 extends slightly beyond the surface of the barrel 13 of the end of the ball point pen. This is done so that one or the other may be used as a handling guide so that when placed between the fingers, a certain portion of the pen is understood to normally occupy the space between the thumb and the index finger. Although it is possible for character recognition equipment to decode waveforms regardless of the starting position, it is made easier to have them initially oriented so that a starting position is assumed for each character waveform and so the decoding devices may be simplified.

FIGURE 5*a* shows an alternative embodiment of the invention. It is shown that a reversal of generating parts may be effected and still the purposes of the invention carried out. In FIGURE 5*a*, the bar magnet 27 acts as the creator of the inducing magnetic flux and in this instance, the ball 12 is formed of non-magnetic ceramic or plastic and carries around its periphery a series of winding lines or conductors 26 which are gyrated through the flux of the magnet 27 and in this manner, the waveforms of electrical current are generated in wires 26 in a manner which is the reverse of the showings in FIGURES 1 through 5 inclusive.

Bal 12 is arranged in the lower end of the barrel 13 of the pen end of FIGURE 5*a* in the usual fashion, and the differences of the construction over those considered hereinbefore are the reversal of parts of the coil and magnet. Although the coil 26 is shown as a focusing arrangement, it is understood that the lines could be in a parallelogram form and thus distributed around the surface of ball 12. Lines 26 are to be of a conductive material such as copper and formed by either a printed circuit process for removing undesired portions between the lines, or the ball could be formed with wires embedded so as to provide a relatively smooth outer surface with enough friction to cause gyration when operated for ordinary handwriting operation.

A pair of extending leads 28 and 29 are embedded in insulation in barrel 13 and extended downwardly to where contact wipers thereon are associated in contact with the various lines of the coil 26 which then becomes not only a generating coil but also a form of slip ring for conducting the generated electrical current from the generating side at the right where magnet 27 is situated, over to the conducting side at the left where the contacts and leads 28 and 29 are situated.

FIGURE 5*b* illustrates a modification wherein the address or identification of the person operating a certain pen may be adjustably set to vary waveforms uniquely. In order to do this, the coil 19 shown in FIGURE 5*b* is adjustably mounted rather than stationary as the coils are shown relative to FIGURES 1 to 5, inclusive. The adjustable coil 19 of FIGURE 5*b* is mounted on the inner surface of an adjustable knob 31 which has a reduced portion 32 fitted rotatably within the conductive arcs 33 and 34 of the plastic segment 17 referred to hereinbefore. Since the coil 19 is adjustably mounted, there is no direct connection with the upwardly extending leads 35 and 36, instead these leads are connected electrically to the arcuate members 33 and 34 which are partially embedded as a stationary track inside a circular opening wherein coil 19 is rocked and frictionally held in any one of several adjusted positions. These positions mark different initial waveform displacement starting points which may be representative of different department numbers, clerk identifications, addresses, etc., and although a waveform generated by the pen is similar in all positions, it would have one of several slight variations in starting position and thus identify the origin.

In a like manner, the orienting bar magnet 23 is vertically adjustable for different start positions and is as well made vertically adjustable to vary the normal pole positions of the ball 11 with reference to the generating coil 19 and thus mark a start position unique for a certain pen or certain operator.

FIGURE 6 shows illustrations of electrical waveforms 38 and 39 productive when forming the characters *a* and *b* respectively by means of a ball pen of the character shown in the present invention. These electrical waveforms have characteristic voltage variations from left to right and are generated for separate letters or shorthand symbols for entire words. The usual interval being determined by the lifting of the pen off the paper between letters, signs, dates, pictorial representations or other handwritten matter. Although such waveforms may be amplified and transmitted directly to control forms of facsimile devices wherein the recording element is quite similar to the originating hand operated pen, there are other instances wherein the waveform is required to be decoded so that other forms of data processing equipment such as accumulators, binary storage elements and output recording instruments may be operated to reveal data in the usual character printing fashion. Many kinds of character recognition circuits exist for analyzing electrical waveform inputs and coding the same for a digital output. One such circuit is shown in FIG. 6*a* and it involves a comparator and an *A/D* converter as set forth in detail in U.S. Patent 3,116,458, issued Dec. 31, 1963. It suffices here to note that a generated waveform by the pen is analyzed as to peaks and valleys and converted to pulses of a digital nature. When representing a numerical character such pulses are to have direct decimal or binary bit values related to the number value for data processing and calculation.

In many instances the generated electrical signals produced by the writing devices disclosed herein are of the waveform variety which may be used rather directly for some application and utilization, but in other instances it is required that there be interpretation and conversion from the analog type of signal to a binary or decimal digit form of signal or data representation. As examples of such waveform conversion devices, there may be noted the U.S. patent classes 328—135 and 340—146.3 and patents such as 2,995,727, 3,089,123, 3,105,956, 3,116,458 and 3,127,601.

FIGURE 7 illustrates a rather direct control by a handwriting instrument over the recording of data by an ordinary electric typewriter. The writing instrument 40 is understood to be one of the several varieties of pulse and waveform generating devices set forth in the present specification. This instrument 40 is understood to be operated with ordinary handwriting movements and not require any mechanical pen linkage grid or matrix, or other form of underlying electrical pad equipment to help in the generation of distinctive signals. Instead, directly connected from the pen 40 are lines to an amplifier 41 which may be of the compact solid state variety for generating strong waveform signals wherein the decoder 42 is aided in interpreting such signals as mentioned in connection with the showing in FIGURES 6 and 6*a*. When such signals are decoded into a binary, digital or some other distinctive machine control form, they are carried further towards the right into the recording machine 43 which may be of the electric typewriter form represented by machines such as the IBM Executive or IBM Selectric typewriters. Thus, it is made possible for the pen 40 when operated with ordinary handwriting or shorthand movements to control directly a typewriter for recording the handwitten information directly and simultaneously with the operation of the hand instrument.

Illustrative forms of electric typewriters are those of U.S. Patents 2,879,876, 2,895,584, 2,919,002 and 3,014,-569 or others of U.S. patent classes 197–16.

FIGURE 8 is illustrative of the kind of system going beyond the recording of ordinary numeral and character shapes and contemplates a facsimile sort of recorder wherein charts, maps and other forms of pictorial representations may be conveyed from a handwritten instrument to a machine control at a remote point. In this system, the novel pen 44 is again connected to an amplifier 45 but, in this instance, the waveform signals may be sent more directly because the apparatus at the other end is in many respects similar to the generating apparatus at the origin. The amplified waveform signals are directed into a transmitter 46 which is understood to be of any of the kinds of telegraphic, radio or microwave transmission devices for sending such signals to remote equipment represented by a receiver 47 for again changing the signal back to an electrical waveform suitable for operating a recording instrument 49 in a facsimile device 48 for producing the kind of record similar to the one generated by the pen 44 at the other end. It is noted hereinafter how several forms of instruments 49 may be made to be controlled rather directly by an originating instrument 44 and in some instances be almost identical with such originating instruments; the main difference being that the member 49 requires some form of suspension and method for traveling with guidance over a receiving record in the facsimile device.

FIGURE 9 is illustrative of a system of coin and pen controlled inquiry stations connected to a central data storage computing and information retrieval station for supplying written, vocal and printed information back to the inquiry station as a form of answer to a question originating at any one of a plurality of such stations. Just as a telephone system serves to connect two or more parties for interchange of vocal data, the system of FIGURE 9 serves to connect any one of a series of magnetic pen inquiry stations 51–52 to a central store 56–57 of general information wider in scope than a centralized library.

An important aspect to note with regard to the system shown in FIGURE 9 is the lack of restraint on the movements of the recording instrument 51 when writing an inquiry on the note paper 50. This may be compared to the lack of restraint in the vocal telephone exchange wherein sounds of any kind or of any language may be directed into the instrument and caused to be interchanged with the instrument at the other end. In the present instance, any form of handwriting or printing may be used and it is not required to be constrained or restricted to any particular part of the inquiry station equipment. In other words, the piece of recording paper 50 may be placed in any position and the pen 51 operated at any angle and still the representative waveforms will be directed out of the generating pen because it is self-sufficient.

In this system of FIGURE 9, the amplifier 53 is receptive to the electrical or electronic distinctive patterns as determined by the coin control apparatus 52 very much in the same style as telephone equipment is controlled for determination whether a message is to be sent or withheld. When it is elected that the inquiry is to be delivered, it is directed into the transmitter 54 which is of any of the remote control variety to exercise control over the receiver 55 at some central station wherein there is a form of buffer storing equipment 56 which may very well be of the magnetic storage variety for holding any number of simultaneous inquiries so that they may be read out sequentially and directed into the computer or information retrieval portion 57 of the central information equipment. A plurality of input and output lines 58 are understood to represent a large number of similar inquiry stations which justify the existence of a large installation for answering questions directed to any number of weather information, tax inquiries, scientific calculations or any other detailed information which goes beyond the ordinary answers expected by phone from a centralized library or weather reporting station For example, a question regarding weather may be directed to a particular locality for a particular time in the future and thus call for an answer which is a great deal more specific than the ordinary weather report. This centralized portion of the information retrieval equipment including storage device 56 computing and retrieval device 57 and a data input arrangement 59 is representative of the form of systems found in Patent Office class 340—172.5 and one form of which is shown in expired U.S. Patent 2,295,000.

When the answer information is properly sequenced in a matter of seconds, it is directed into output lines to a transmitter 60 and then to a receiver 61 which carries it and directs it into the printer 62 at the same inquiry station 51 and there there is a recording instrument 63 which may be of the handwriting form discussed relative to the showing in FIGURE 8 and of the kind to be discussed hereinafter. This device 62 at the inquiry station is understood to be productive of an answer sheet 64 which is a written record of the answer corresponding to the inquiry placed on the sheet 50 by ordinary handwriting movements. Some part or all of the interchange may be by sound as noted by combined microphone and speaker units 205 and 205' at both ends. In both instances, the instruments 51 and 63 are not limited to representations in numerals and characters alone but may provide sketches, maps, charts and other depicition of information going beyond that of ordinary message form.

Before proceeding to describe the various output devices shown in FIGURES 10–12, it is well to note that the well known similarities between electrical generators and motors is evident here between the input devices as represented by that of FIGURE 1 and a typical output device or recording facsimile instrument as represented in FIGURE 11. Whereas the former is concerned with the generation of a control current, the latter is concerned with the utilization of the current to drive a ball 75 to effect a recording at the printing device end of a system.

FIGURE 10 shows one form of recording device assumed to be in a facsimile recorder and to be under control of a handwriting instrument such as that shown in FIGURE 1. For purposes of clear illustration only, it is assumed that the sending device or ball point writing instrument of FIGURE 1 is to have only two current generating coils associated with the recording ball 11. Then turning again to FIGURE 10, it is seen that this instrument has two motors 70 and 71 which are to be connected to the pair of coils operated by the generator through amplifying and transmission devices. These motors in turn operate flexible elongated frictional shafts 72 and 73 for rotating a recording ball 66 which is located at the lower end of an inking supply tube 67 and mounted in a socket formation for free rotation in the bottom of a waltzing frame 68 formed with an annular skid ring 69 adapted to skim over the surface of a recording paper and allow the ball 66 to rotate frictionally in a free manner in all directions to reproduce any writing or chart markings made at the input end by the ball 11 of FIGURE 1. Although only two motors and two generating coils are shown for purposes of simplification, it is evident that a number such as four may be used to have greater degrees of angular and gyratory action with regard to both generation of the control current and the control of movement of the recording ball 66 so that all motions are duplicated in detail.

FIGURE 11 shows an alternative form of recording instrument wherein the motors of FIGURE 10 are dispensed with and instead the ball 75 is to be driven as in the case of a rotor in a motor by the flux generated by two or more heavy coils 77 and 78 mounted in the end of the recording instrument and there applied to the magnetic material ball 75 so that when currents are derived from a recording instrument such as FIGURE 1, such currents are amplified and impressed through the coils to effect strong flux for moving ball 75 in accordance with the movements of the input ball. This ball 75 is mounted in the lower end of an instrument body 76 which has an ink flow tube 67 and a series of motor drive coils 77, 78, each of which has leads 79, 80 for bringing in amplified control current from a writing and generating instrument such as that of FIGURE 1.

FIGURE 11*a* illustrates another form of recording device wherein printing need not be of the continuous line script form of recording although such writing output is possible with the construction, instead, an alternative form of operation is one wherein the ball is rotated to a certain position wherein letter forms are provided so that a printing or stamping form of operation may be employed and the characters recorded by impression rather than by smooth continuous inking movements. The ball 82 of this embodiment is assumed to be of magnetic material and formed by etching or embossing with a series of several rings of characters coinciding with the kind of character arrangement found on the IBM Selectric typewriter recording ball. This ball 82 is driven to any one of its recording positions by means of magnetic flux operating coils 77 and 78 which are embedded in the lower end of the recording instrument 83 and operated much in the same fashion as the recording device of FIGURE 11. An impression may be effected against a curved platen or a flat platen carrying a record.

As an alternative form of orienting device for bringing the ball 82 back to a normal position whenever desired, there is furnished in FIGURE 11*a* a substitute for the usual bar magnet 23 found in FIGURE 1. This orienting feature takes the form of a magnetic material tube 84 assembled within the center of the instrument body 83 and surrounding the inking tube 67. Around the circumference of tube 84 is a wire coil 85 which may be energized optionally to cause attraction by tube end 84 and ball orientation whenever desired. When coil 85 is so energized, the tube 84 is conditioned to be a strong bar magnet and then it serves to attract one of the poles of the ball 82 and acts to bring it back to the normal erect position shown in FIGURE 11*a*.

Among the recording instruments noted in FIGURES 10, 11 and 11*a*, it is seen that the device of FIGURE 10 is rather self-supporting since it is suited to skid over a recording surface on the annular ring 69 while recording with the central ball 66. However, the other forms of recorders shown in FIGURES 11 and 11*a* require some form of suspension means for holding the instruments 76 and 83 erect while the ball is moving and recording in various directions over a record paper. For such purposes, the arrangement shown in FIGURE 12 may be used, and it not only provides a form of suspension means for devices of the kind shown in FIGURES 11 and 11*a*, but also has a form of operating means for causing impression of the particular type of recording ball 82 shown in FIGURE 11*a*.

In FIGURE 12, a recording instrument 87 is shown suspended between an upper magnetic plate 92 and a lower recording plate 90 over which there is a sheet of paper 89 or some other receiver of the written information. At the opposite ends of the recording instrument 87 are the ball arrangements 88 and 91 which are assumed to be of construction such as that of a ball point pen wherein the ball is freely rotatable without being loose in the sense of being possibly extracted. Ball 88 may take the form of any of the recording balls already noted and be operated in those respects to follow the electrical direction of an input device and so operate with writing or printing movements over the surface of paper 89 and cause a facsimile or reproduction of the movements at the input end by a device such as that of FIGURE 1. At the upper end of the instrument 87 is another controlled ball 91 which is assumed to be of magnetizable material also and therefor be attracted and held upwardly against the magnetized plate 92 which will hold it erect without restricting its movements so that it may turn as driven and follow the movements of the lower ball 88 and thus the pen 87 is progressively moved in synchronism between the two plates and meanwhile describing a written notation at the bottom end while operating in synchronism in order to hold the instrument erect as recording proceeds. A letter spacing means 94 serves to direct line space and letter space control impulses into the movement control ball 91. A vertical stabilizing means 9 is also useful to hold the pen 87 in true vertical alignment at all times by adjusting ball 91. Although the magnetic plate 92 is shown as one form of suspension means, it is apparent that a form of pantograph linkage may be used to hold a recording instrument erect while allowing it free movement in all linear directions over a recording sheet.

When the showing of FIGURE 12 is to include the etched type of ball 82 shown in FIGURE 11*a*, then it is desirable to impart some form of impression movement to the recording instrument at certain intervals when the positioning of the ball has been effected and the instrument is ready to be operated vertically in an impression effecting motion. In order to do this, the plate 92 may be provided with a vibrator 93 which is energized selectively to cause the plate to have rapid vertical up and down motions and so will move the lower ball 88 accordingly wherever an adjustment has singled out one of the character shapes to be at the exact lower most point. Such a character will then be stamped into the recording receiving area chosen by movements which may be independent of the movement designed to turn the ball to the desired recording position. In this modified form of construction, the upper ball 91 may be controlled to effect the desired letter space position along a line of print, and the lowermost ball 88 may be twisted in order that a certain character such as those shown on ball 82 may appear at the lower most part of the instruments 87 and then, with the vibrator 93 operated momentarily, there will be a recording of the particular character selected on a pressure sensitive paper or through an inking ribbon if not inked from within.

In FIGURE 12, it is noted that a separate letter space device 94 may be provided to energize one or more of the drive coils associated with the ball 91 to rotate it laterally and longitudinally for letter spacing as well as line spacing in synchronism with the recording of the letters by impressions imparted by the vibrating device 93. In other words, there would be interspersed operations of 93 and 94 in order to cause letter spacing of the impressions recorded by the ball 88.

Although the facsimile recording devices of FIGURES 10–12 have been described as mainly direct controlled forms of recording instruments, i.e., the hand urged movement of ball 11, FIGURE 1, is controlling over rather direct control of the movements of balls 66, 75, 82, 88 or 91, it is to be understood that some form of decoder such as that pointed out with respect to FIGURE 7, may be used so that an input version may differ from that of the output. For example, the input may be in the form of shorthand, letter printing, script, foreign language, graphical or geometric outlines, and any one of these could be decoded to any of the others at the receiving end.

FIGURE 13 is illustrative of a self-contained form of magnetic ball point writing and recording device which is free of all trailing wires and may be carried freely on one's person into libraries and other sources of information without need for connection to any recording device extraneous to the instrument itself. This is made possible by the incorporation of a wire or tape recorder of a miniature size assembled into, and removable from, the body of the recording instrument and provided with a magnetic recording wire or tape to record the pulses or electrical waveforms generated by the magnetic ball end of the instrument.

A wire or tape recording device of the miniature variety may follow along the lines of such devices in U.S. patent class 179—100.2 or as noted in U.S. Patents 2,456,767, 2,584,733, 2,584,734 and 2,620,403.

The body 96 of the instrument shown in FIGURE 13 is shown to have at the lower end, the magnetic ball 11 of a recording ball point pen such as that shown in FIGURE 1. Also associated with ball 11 is the orienting bar magnet 23 and the generating coil 19 of the general form shown in FIGURE 1. In this particular embodiment of FIGURE 13, it is noted that the ink supply holder 97 is of a stunted form of construction in order to provide room for the removable wire recorder assembled above it on frame 105 which is insertable and removable by means of the door 102 mounted to be hinged or shifted with respect to the outline of the pen body 96.

The wires extending from the generating coil 19 are directed into an amplifier 101 of the miniature solid state variety and from there the impulses are carried into a small magnetic recording head 98 which is assembled in the device to cooperate with and record magnetically on the moving strand of the small wire recorder. Such a strand 106 is either a magnetizable wire or a small strand of magnetic recording tape which is drawn between spools 99 and 100. As a means for powering small motors (not shown) for driving the reels, and also for powering the amplifier 101, etc., a power supply in the form of a small battery 103 may be assembled near the upper end of the instrument body 96 and access thereto may be derived through the upper removable plug 104.

A switch may be hand set or automatically operated wherever the ball 11 is impressed for writing movements, and thus start the strand 106 moving and also power the amplifier 101. Such forms of switches are not shown but it is obvious that they may be provided near the lower end of the instrument 96.

One of the advantages of the device shown in FIGURE 13 is that it may be operated for making easily decoded notes in situations where silence is enforced. For example, in a library where operation of typewriters and dictating machines is prohibited, it is possible to write notes and at the same time store the wire recording on a reel 99 which may be used later for control of a printing device such as a typewriter. In the case of making diagrammatic, surveying, meter reading, chart or geometric diagrams, it is also possible to store the electrical waveforms associated therewith on the magnetic wire recorder and then later have them reproduced by any of the forms of facsimile machines or other recorders designed to decode and interpret the movements of the generating ball 11 and have such movements either reproduced or decoded to be interpreted in the desired form.

In the form of the wire recorder shown in FIGURE 13, it is possible to have more than one of the recording heads 98 aligned against tape 106 and control such heads to be receptive of other electrical control signals noted herein such as time signals, address signals, etc., to be related on tape 106 with two or more tracks so that the handwritten recording of one track may be related to the other information recorded on a secondary track.

FIGURE 14 shows a double ended form of recording instrument of the kind shown generally in FIGURE 12. Since this instrument of FIGURE 14 is designed primarily to enter, calculate and store numerical information, it may be operated singly, that is to be operated manipulatively for entering numerals in storage and then later turned around to be placed in an apparatus such as that of FIGURE 12 and operated to record the output of calculated information related to the numerical information entered. However, if a real time arrangement is desired, two such instruments may be used, one as a freely movable handwriting input device and a second similar arrangement situated in the device such as FIGURE 12 to be related for output movements and recording.

Turning now to FIGURE 14, it is seen that each pen end is provided with a recording ball magnet 11 and one or more generating coils 19 related thereto and wherever desired, there is an orienting bar magnet 23. Ink supply sacks 97 are mounted at both ends of the recording instrument 108 and they are optionally used or shut off by means described hereinafter. However, for most purposes, a written record is desired of numbers to be used as factors in a calculation and, as such numbers are written. they are entered into storage through an amplifying means 109, a decoding device 110 and storage and calculating equipment 111.

In the calculating form of instrument 108 shown in FIGURE 14, the decoding system most useful would be of the kind noted generally hereinbefore dealing with character analysis of electrical waveforms and converting the same into the binary equivalent of the number formed by handwriting. Then such binary representations are stored in the form of core array or solid state arithmetic device of a matrix form and derived therefrom, calculation as operated in various arithmetical styles in order to produce a result which may be in turn brought back into storage and for representation on the flash indicator 113 noted and shown in the center of the instrument 108. Above the flash indicator 113, is a power supply in the form of a small battery 114 which is to be inserted through a hinged or slide opening 115 formed in the side wall of the instrument 108. Another such hinged opening 112 gives access to the amplifying, decoding, calculating and storing instrumentalities of the device.

A number of switches (not shown) determine the character of the output indication. In other words, the calculated result may be indicated on the flash indicator 113 or it may be directed upwardly into the upper end of the instrument which is the output recording end and there impressed upon the current carrying coils 19 and 19' so that the ball 11 associated therewith is put into gyrations representative of the numbers indicating the result. When the instrument 108 of FIGURE 14 is to be operated in the output fashion to print or scribe a number representing a total or product of calculations, it may be suspended by panograph linkages or suspended in the fashion shown in FIGURE 12 where the output end would be turned 180° to become the lower recording end in cooperation with a sheet of paper 89.

It is contemplated that associated with the numerical calculating instrument of 108 of FIGURE 14, there will be incorporated an error checking feature involving the casting out of certain modulus number, for example, nine, so that an entry of a factor would be accompanied by a check symbol number formed as the handwritten number is inscribed left to right. An example of a patent involving such casting out principles is the expired U.S. Patent 2,241,591, which shows a simple form of error checking device useful for avoiding errors when entering factors and producing results in multiplication or division. The circuitry of the patent is to be miniaturized and incorporated in the flexible printed circuit sheet 118 of FIGS. 15 and 16. In other words, the intention is that the writing instrument 108 is to be a form of calculating pen wherein answers are so checked that errors are avoided in calculation and the recording of the result.

It is contemplated that after a list of factor numbers are made and the instrument is drawn from left to right to underline such numbers for the purpose of addition, for example, then the casting out principle is diverted from the factor symbols, to be resumed with regard to the symbols printed or written to represent the result underneath the line from left to right. Such a straight line is decoded as just one variation of a waveform. Result symbols are written or printed in decimal fashion, such symbols being followed by a flash indication of a check symbol which may be compared with the symbol resulting from the entry of a large number of preliminary factors so that the two must compare in order that the calculation is the correct one relating to the preliminary factor of numbers. A comparing device of the form shown in U.S. Patent 3,075,176 is usable.

The flash indicator 113 is to be either a photoluminescent display or an assembly of light weight circular elements, each bearing a series of numerals associated with window spaces for showing the degree of adjustment of one or more of the circular elements. Such devices are found in Patent Office class 235—127.139.

FIGURES 15 and 16 show representations of how the magnetic ball point instrument is to be fully implemented by means of micro-miniaturized and flexible integrated circuitry.

FIGURE 15 shows that a central ink carrying barrel 119 of the pen 117 has encircling it as a spiral flexible sheet, a printed circuit 118 carrying the various passive and active elements for implementing the various amplifying, decoding, calculating, comparing and storing needs associated with the input electrical waveforms generated solely by the ball 11 at the bottom writing end of the instrument or jointly with an outside source and a program device 132. In this instance, a cable 121 will carry one or more pairs of wires which are connected to a top plug 120 which is to be plugged into the stationary plug 122 connected by pairs of wires with the inserted printed circuit 118.

It is understood that the spiral printed circuit 118 is to be formed when spread out in a planar form as shown in FIGURE 16 and then rolled in a spiral before being inserted into the barrel of the writing instrument 117. It is optional whether the generating coils and orienting bar magnets are to be incorporated directly into the instrument body 117 or arranged on the printed circuit and incorporated into the instrument in that fashion.

Referring to FIGURE 16, it is seen that the integrated circuitry is mounted on a thin flexible sheet of insulation material 118. This material may be of Mylar, Teflon or a similar type of strong plastic in the order of five-ten mils in thickness and having thereon a number of active and passive circuit elements as well as conducting lines formed by means of either etching or vacuum deposition printed circuit processes or a combination of the two.

At the lower left corner, it is seen that there are formed the pair of generating coils 123 and leads extending therefrom upward into the circuitry for amplification at 125. Interspersed with the coils 123 are deposits of magnetic material 124 in bar form to formulate orienting magnetic structures for cooperation with a ball 11 of magnetic material to orient it every time the writing instrument is lifted above the paper.

Amplifying devices of the kind to be used at block 125 are of the general type found in Patent Office class 330, and represented by a patent such as 3,124,758. Both the amplifier 125 and decoder 126 are understood to be miniaturized semiconductor devices.

While at times the generated electrical output is in the form of pulses which may be readily counted, in the major portion of contemplated usage, the output from the amplifier will be in the form of numerical electrical waveforms which need to be identified as to number or character by the decoding means 126. Then the output therefrom would be in the form of binary pulses either distributed in one line or allocated to different parallel binary lines representing 1, 2, 4, 8 in a numerically coded binary system.

As a matter of storage, there is shown diagrammatically in FIGURE 16 a magnetic core array 127 into which the pulses may be directed to set up storage by the actuation of selected cores or thin film memory elements. In such storage devices it is well known that arrangements may be made to compare various portions of data and to check such data and to emit data as directed.

A power supply 128 is shown as connected to the top of the printed circuit 118 and it is understood that such a supply may be in battery form and assembled directly into the writing instrument or be remotely situated and connected thereto by a cable such as the cable 121 shown in FIGURE 15. Program devices 132 may also be closely related or remotely situated to control the sequence of passage of the pulses and decoded material from one unit to the other as appearing on the printed circuit 118.

As one step in the treatment of the data received from the pen movements, the numerical data may be passed from storage in unit 127 to a binary calculator 129 of class 235—164 as shown in Patents 2,703,202 and 3,015,444.

After being operated upon in the calculator, the data may then be processed in the converter 130 to change it from a binary representation of a product or result and to change the same into decimal formation to be more readily readable. Converters of this variety are found in Patent Office class 340—347 and may be represented by patents such as 2,972,137 or 2,975,409.

As a final form of treatment for the data handled on the circuitry of substrate 118, there is the matter of carrying the information either to the outside to be recorded or indicated or to do the same sort of thing directly on the circuit substrate itself and allow it to be revealed through a window 116 in the body 117 of the writing instrument shown in FIGURE 15. In order to so indicate or record the decimal result, a unit 131 may be of the photoluminescent variety wherein distinctive portions representing numbers or characters selectively illuminated to reveal the product handled inside the writing instrument. If such utilization is to be carried on outside the writing instrument, then the output of element 131 may be carried through the lead wires 133 extending towards the top of the instrument and then passed through the same as shown in FIGURE 15 to be carried outward in cable 121.

The indicator or output display devices 113 or 131 may be of the photoconductive and luminescent type of patent class 313—108 or as in U.S. Patents 2,895,054 or 2,904,626 wherein code or digital arrays of lighted spots indicate a result. Behind windows 116 there may be present on the flexible substrate a spot or grid display indicator device such as that of Patent 2,904,626.

The core array 127 of the substrate may be of a purely storage design nature as of the devices of U.S. patent class 340—174 and Patents 2,666,151 and 2,970,291, or of an arithmetic nature of the kind disclosed in U.S. Patents 2,640,164 and 2,681,181.

FIGURES 17, 18, 19 and 22 are concerned with the proposition that the movements of the novel writing instrument may not necessarily be in the ordinary script form for describing numerals and characters, but various forms of shorthand or code markings may be employed to represent numbers and characters. For example, in FIGURE 17, the numeric code ball movements are shown in two different styles underneath corresponding numerals 1 to 0. These two styles include an arbitrary form of marking wherein various vertical, horizontal and angular movements represent the numerals. Beneath the arbitrary form is one of a more logical arrangement having binary representations for the main binary characters 1, 2, 4, 8. These are then combined to formulate representations of 3, 5, 6, etc.

FIGURES 18 and 19 relate to the proposition that the ball movements of the novel writing instrument may be made compatible with the movements of an existing recording device so that a smaller number of control parts may be utilized between the writing instrument and the utilization output. As an illustration of such use, the element 135 shown in FIGURE 18 is the ball printer of the IBM Selectric typewriter. On this ball the characters are arranged in four circumferential rows 136 and spaced in twenty two columns in such rows. Selection of particular character is by two main movements of the ball, tilting up or down to select a row and rotating to select a column. Such an array of possible movement is shown in a flattened form by grid 134 in FIGURE 19. There is seen that by eleven movements to the left or to the right and two different movements vertically, it is possible to select any one of the eighty-eight character locations. A representative movement for the selection of one character is indicated by line 137 which may be taken to be the movement of the end of the writing instrument which, when made on any sheet or on any shorthand grid paper, is controlling over the synchronous movement of the ball 135 of the typewriter and such a manner is a more direct control of recording by shorthand writing. It is to be understood that along with the control of the line 137 in FIGURE 19, there is also a switching control operated by the lowering and lifting of the writing instrument wherein initiation and termination of the recording stroke of the typewriter is coordinated with the lowering and raising of the writing instrument.

FIGURE 22 shows a form of document 138 whereon an abstract of some article may be recorded in word form as well as by shorthand symbols such as those in the Gregg system. In order to utilize the miniature wire recorder in a novel writing instrument of the kind shown in FIGURE 13, it is best to economize on the number of movements representing words and for such reasons the showing in FIGURE 22 represents how the recording instrument in tracing over the Gregg code form of word symbols 139 will enonomize in the amount of representation on wire or tape. At the same time, this mode of storage of data represents a silent method whereby information in libraries may be noted, recorded and carried out without operation of dictation or other recording instrumentalities relying on sound effects or causing sound effects.

When operating the novel writing instrument in the mode of tracing such as required by the record of FIGURE 22, or in other sensing modes herein, it is often desirable to eliminate the inking function of what is normally a writing instrument. For such purposes there is a showing set forth hereinafter illustrating how ink flow may be terminated when the recording instrument is to be operated in a fashion for tracing of signs, geometric figures, graph illustrations, weather maps, etc., without the necessity for marking such pictures.

FIGURES 20 and 21 are illustrative of a form of operation wherein the ball of a ball point writing instrument is drawn with a rapid movement over some prearranged background, and by means of frictional or magnetic treatment of the background material, the ball is twisted, turned and gyrated to send out signals representative of the material associated with a document. As an illustration of such control, FIGURE 20 shows a charge plate 141 which not only holds the usual embossed information regarding a customer and customer number, but is also formed with a groove 142 wherein various portions of frictional extensions of frictional angular areas are treated as represented at 143. When the ball of the novel writing instrument is placed in the groove 142 at its left and drawn with a rapid movement from left to right, then the areas of friction 143 will cause the ball to turn and skip and gyrate in a code arrangement which is representative of the name, address, number, etc., of the customer. It is obvious that in a large retail establishment, if the clerk in recording a transaction is enabled to make such a charge record with one quick stroke, regarding the identification of a customer, then the saving of time over a period of hours is substantial. Although illustrated in connection with a charge plate, it is apparent that similar grooves 142 may be placed in merchandise tags, credit cards, or any form of metal, plastic or paper document or record insturment wherein it is desirable to interpret the instrument with a mode of recording which is faster than handwriting or printing.

An enlarged view of such a grooved instrument is shown by the illustration in FIGURE 21 where a data bearing instrument 144 is formed with a groove 142 shown enlarged so that the arrangements of frictional lines or embossings or indentations 145, 146, 147, 148 and 149, are shown as being arranged at four different levels, these different levels to operate at different portions of the semi-circular depression 142 so that a ball drawn across such a groove is gyrated and skipped selectively and with different angular movements so that it is operated to generate code signals in waveform or pulse form to be transferred to decoding instruments for revealing the kind of data held by the document 144.

When groove 142 is lined with magnetizable material, then marks 143, 145–149 may be of a magnetic form, to act upon ball 11 with intervals of momentary drag and gyration interspersed with intervals of ball skip and homing to cause with one stroke, a whole series of code magnetic gyrations and electric generated waveforms representative of a document.

In FIGURE 20*a* is a representation of the manner in which coded characters 8 printed with frictional or magnetic stripes of the CMC 7 code style may be sensed in one horizontal stroke of a pen 17 with the novel magnetic ball end 11. Since these striped numerals 8 are coded with widely and narrowly spaced stripes of magnetic and frictionally distinct material a ball 11 drawn over them will skip and start in a coded pattern which is readily recognized electronically as noted hereinbefore. The CMC 7 is a code style of the kind printed on European documents for magnetic head sensing, but the present hand instrument simplifies the sensing procedure.

FIGURES 23, 24, 25 and 25*a* are four views showing various arrangements whereby Hall devices may be associated with or embedded in the ball of a magnetic ball point recording instrument. In FIGURE 23, it is seen that an instrument 151 carries within it a spirally formed flexible printed circuit 152 controls and they encircle the ordinary inking barrel 153. Mounted on the top of instrument 151 is a plug socket 154 for receiving the wire holder 155 which is connected to a cable 157 carrying various sets of input and output lines such as 156 and 158. Certain of these input lines 156 are intended to carry a control current down through the printed circuit 152 and carry it into a Hall device at the lower end of the instrument shown diagrammatically as a plate 160 mounted near the usual magnetic recording ball 159 which is intended to be operated in the various manners set forth hereinbefore for handwriting, printing and graph making motions, all of which tend to gyrate the ball in distinctive patterns whereby varying forces of magnetic flux will be exerted against and through the plate 160 which is intended to be of a semiconducting material characteristic of Hall devices.

A Hall device may be defined as a structure wherein conductors or semiconductors are subject to electric and magnetic fields whose direction are at right angles to each other. Charge carriers of the conduction current experience a force due to the presence of the magnetic field. For a comparatively large Hall EMF, a Hall plate of indium antimonide has the advantage of high electron mobility, but other semiconductor materials are also usable. The output EMF is proportional to the product of two quantities and is useful for applications where joint effects are to be exerted or when a product is desired as in multiplying. One of the usual measures for sensing the output of a Hall device is by means of probing either singly or at intervals, and it is contemplated that this is one form of sensing control to be used here. Pulse voltage level changes are produced by any combined waveform and pulse impressions at selected intervals and these may be sensed for utilization and interpretation.

FIGURE 24 is an enlarged showing of the Hall device mentioned as being at the lower end of the instrument in FIGURE 23. In FIGURE 24 it is seen that the magnetic material ball 159 is mounted in the usual fashion to turn freely in the lower end of the instrument 151. However, mounted adjacent to one side of the ball is the Hall plate 160 which is to be made of a semiconductor material and be situated to be influenced by magnetic ball flux directed through it at right angles to the surface of the plate. Two pairs of lead wires 161 and 162 are connected to opposite edges of plate 160 and provide the means for input current and probing respectively.

In FIGURE 25, it is shown diagrammatically how a plurality of Hall plates H1 and H2 may be mounted adjacent the gyrating magnetic ball 159 and serve to communicate a plurality of input currents relative to varying magnetic flux in order to get a more highly distinctive readout from more than one analyzing Hall device.

FIGURE 25*a* shows a modified embodiment wherein the Hall plate 165 is embedded in the rotating ball 164 which in this instance, is no longer of magnetic material but rather of some abrasive plastic for gyrating in the same fashion as the ordinary ball of a ball point pen, but in the present instance to be performing these movements in the presence of a strong magnetic field generated between two pole pieces 168 and 169 mounted on opposite sides of the recording instrument and having poles situated to direct strong flux across the ball 164 so that the plate 165 therein is effected variably magnetically when gyrated at different angles to the lines of flux.

In order to bring electrical current into the Hall plate 165 and to carry indications out of it in a probing fashion, the ball 164 is provided with windings or wires connected to the opposite edges of the Hall plate 165 in the ordinary fashion and these lines 166 and 167 are embedded in the outer periphery of the ball 164 and although shown as single lines, it is understood that a plurality of such turns may be arranged to almost cover the surface of the ball. In order to carry electrical current into and out of the ball structure, a number of pairs of leads 170 and 171 are embedded in the interior of the writing instrument in an insulating structure and extending therefrom at the lower part are wiping contacts in the form of slip-rings structures which cooperate with the surface of ball 164 and thereby at intervals will carry current into the ball 164 and into the plate 165 and also probe the output lines for varying voltage levels productive of conditions caused by the gyrations of the ball and plate in the field of magnetic flux between the pole pieces 168 and 169. Output readings may come at regular intervals or at sampling intervals in the cases of FIGURES 24 and 25*a*, respectively.

Probing for varying electrical characteristics of output voltage levels may be done at regular intervals in the case of the construction of FIGURES 23–25 and the probing at random will evolve naturally in the device of FIGURE 25*a* when the output contacts touch the imbedded wires and become effective as the ball gyrates.

Hall devices are to be found as represented in patents such as 1,778,796, 2,536,805, 2,995,702 and 3,037,199.

FIGURES 26 and 26*a* have to do with forms of recording with a magnetic ball point pen of the kind represented in the present invention wherein the ink deposits of a magnetic character are distinguishable by the nature of the magnetic characteristics as well as the shaping of the ink in optically recognizable characteristics. In FIGURE 26 it is seen that the recording instrument 175 is provided with the magnetic ball 174 for turning freely to deposit ink in the usual fashion. However, in this instance the ink 176 carries magnetizable or magnetic particles, preferably particles of an elongated accicular form so that orientation is unusually effective therewith. Then, when a character such as the enlarged character 2, identified as feature 177, is deposited by stroking the pen end in the usual fashion, it will be seen that as the ball 174 gyrates, it deposits ink in a distinctive magnetic pattern which is additional to the distinctive optical pattern.

As the ink is deposited magnetically upon the surface of the recording material 173, the patterns of ink alignment or orientation, as shown in portions 178, will assume the formations somewhat like the well-known Bitter patterns where various domains or zone areas of adjacent portions of material have magnetized particles pointing in different directions. These magnetic patterns are as distinctive as fingerprints for the identification of persons writing, since all strokes are made with different degrees of intensity, speed and direction and, thus have characteristic patterns which may be picked up and analyzed by one or more magnetic recording heads 179 as shown to the left of the representative character 177.

FIGURE 26*a* is concerned with another form of recording with magnetic ink whereby the deposits thereof may be selectively erased or magnetically coded to be related to, and only optionally identical with, the character optically inscribed by the recording instrument. In other words, as the recording instrument deposits magnetizable ink in a visual and optical recognizable shape, a recording head travels over the same ink and treats it magnetically to be either similarly coded or coded in a manner merely related to the optical shape. For example, a number may be written in the arabic notation but coded magnetically in a binary form. In the particular example taken in FIGURE 26*a*, it is designed to record in an ink shape of ordinary English characters but coded suitable for representation in the CMC 7 code which is effective for many interpretations of numbers in European documents.

In FIGURE 26*a*, the recording instrument 191 is assumed to be either hand-operated or more probably controlled at the end of a receiving system and there provided with the ball 180 which is to be gyrated in accordance with an incoming signal. The ink used in this modification is assumed to be magnetizable and in this instance, not too much effected by the flux of the ball 180 but more effectively controlled in the magnetic fashion by one or the other of the magnetic heads 185 and 186 built onto the lower end of the instrument 191. The magnetic head 185 is provided primarily for erasing purposes and is optionally called into operation with an erasing oscillator 7 by switch 190 to erase the portions of the record to the right of the oncoming ball 180 so that a magnetically clear area is presented for deposit of the ink 181 shown behind the ball.

The driving means for ball 180 is not particularly shown in FIGURE 26*a* but it is assumed to be any of those varieties discussed hereinbefore. The pick-up coil 187 is associated with the ball magnet 180 in the usual fashion, and the electrical waveforms therefrom are carried into an amplifying device 188 and from there into a decoder 189. The decoder in turn carries its impulses down into the coil of the recording magnetic head 186 which is to be swept over the drying ink 181 and provide a characteristic magnetic pattern therein which is either representative of or related to the character decoded.

In a style of operation suited for representation magnetically in the CMC 7 code, there is provided in the present embodiment FIGURE 26*a*, a mask 183 formed with 13 vertical apertures 184. The reason for providing such apertures is that a character is written over the mask, the recording is divided into separate stripes, such stripes being readily magnetized in seven different areas to be coded for the CMC 7 code.

After a character is inscribed over the mask 183 and the ink 181 deposited therethrough, there are thirteen portions left to right dividing the character into ink stripes vertically, such a striped arrangement is then drawn towards the left, i.e., the recording instrument is drawn towards the right and the recording head 186 is drawn over the striated recording after it is deposited. In the meantime, the character is analyzed through the generating equipment 187, 188, and 189 and it is decided which of the vertical stripes are to be magnetized to represent the code arrangement. In the CMC 7 code, there is a distinictive arrangement of wide and narrow spaces to represent magnetically a character by a left to right arrangement of wide and narrow spaces between magnetic ink marks. In the present instance, with the 13 vertical marks to operate on, certain of these marks may be skipped by the magnetic head and in effect provide a wide separation spaces whereas other successive lines are magnetically treated sequentially to provide narrow division between two magnetized stripes.

Although in FIG. 26*a*, the recording heads 185 and 186 are shown as attached to the recording instrument 191, it will be realized that they may be separately mounted and arranged to operate independently of said instrument if it is desired to provide more room and more drying space between the formation of an ink character and the magnetic treatment of it.

FIGURES 27 and 28 show embodiments of the invention concerned with the element of time to be recorded relative to written matter. In many business transactions such as the ordering of stock or placing of bids, the element of time is very important and in the present instance the intention is to superimpose or accompany compatible magnetically derived signals of time upon or alongside related character code signals representing words or numerals as part of a business transaction. In FIGURE 27, the writing instrument 96 is seen to have many of the characteristics of the instrument shown in FIGURE 13. It has the same style of character handwriting input arrangement whereby the magnetic ball 11 influences the winding 19 to record through the magnetic recorder 98 held within the pen under the hinged opening 102 in the frame. However, in addition to the magnetic recording means for the written material, the instrument also includes a time piece 193 mounted near the top and arranged to have output signals representing hour and minute intervals generated through magnetic effects and induction in coils made conductive in somewhat the same manner that the coil 19 is affected inductively by gyrations of the ball 11. The specific signal pulse generating means inside the time piece 193 is shown in FIGURE 28.

In FIGURE 28 it is shown that the time piece has a sweeping second hand 194 and a pair of minute and hour hands 198 and 196 operating in the usual fashion. However, in addition to the usual arrangement, the second hand 194 is provided with a strong bar magnet 195 which is situated to sweep past a series of coils, one of which is an insulated induction coil 201 mounted on a projection 200 which is a fixed reference point to indicate the distance between induced impulses so that an extent of time may be gauged for the impulses derived from the hour and minute hands. The minute hand 198 is designed to have an insulated film arrangement whereon there is a pick-up coil 199 which is situated to be near the sweeping southpole end of the bar magnet 195 whenever it passes at the speed of one minute per revolution intervals. In somewhat the same fashion, the hour hand 196 is provided with an insulated coil 197 which is situated to be adjacent the northpole end of the bar magnet 195 when the same sweeps past in one of its excursions.

Because of the time-variable arrangement of the three coils 197, 199, and 201 it is evident that three impulses therefrom at different intervals will be indicative of the time represented by the position of the clock hands at the time of any excursion of the second hand 194. These sets of three impulses may be selected at any time of instrument use and directed through lead wires 202 and 203 and they, in turn, referring to FIGURE 27 are to be directed into an amplifier 101, and then either carried directly to the recording head 98 or sent first through a decoder for interpreting the time for decimal or binary representation in the magnetic recorder. Head 98 may be the same head carrying the written magnetic waveform decoding and electrical control, or an adjacent head 98′ to write in synchronism with the written matter head. The recording medium 106 may be of a single strand type or wide enough in tape form to record both styles of written and timing impulses side by side or superimposed.

The showing in FIGURE 29 has to do with a novel writing instrument involving the simultaneous recording or emitting of vocal sounds along with the recording of handwritten or printed information. Although shown with an input and output cable 209 which may be used in the case of operating feature 205–206 as a speaker as well as a microphone receiver, it is of concern also that the instrument 96 be sometimes used as a self-contained affair having behind the door 102 a small wire recorder or tape recorder for recording sound effects simultaneously with written effects. U.S. Patent Office class 179–1 deals with dual transducers of the combined microphone and speaker type.

When the element 205 is operated as a microphone and the portion 206 is some form of diaphragm vibrated over magnetic apparatus to generate waveform electrical currents representative of vocal sounds, then it is realized that such sound representations may be communicated down into the small magnetic recorder and placed on magnetic tape, either superimposed or alongside the recording made by hand in writing words or other symbols as noted hereinbefore.

The significance of this embodiment in FIGURE 29 may be realized when it is explained that the writing of a word and one language may be accompanied by the vocal sounding of it as interpreted in a different language. Then the two magnetic recordings go superimposed or side by side on a recording tape and together furnish a form of teaching instrument. When such tapes are taken out of the recorder and put into a device for interpreting both recordings, in a recording fashion and a vocal fashion, it is easy to realize that a student watching the inscription of a word simultaneously with the sounding of the same in a different or similar language will be instructed to associate the two thereafter when presented either in a vocal or handwritten form.

As another form of teaching device, the input cable 209 may be assumed to carry sound effects into transducer 205 when it is to be used as a speaker and thereby instruct a student with the instrument 96 in hand, by posing questions or speaking in a foreign language and requesting an interpretation which is to be written by the ball end 11 of the pen and possibly transmitted back out of the cable 209 for ready determination if the answer is correct.

With an instrument such as that shown in FIGURE 29 used in the system shown in FIGURE 9 then it is realized that the system has all the advantages of a telephone linkage as well as the other recording means for sending and receiving written as well as vocal information. With such an arrangement, the central station 57 may be assumed to include human instructors as well as the electronic devices. In such a fashion, one instructor could be connected with any number of students and vocal as well as written instructions could be passed back and forth both ways. For such uses, the system shown in FIGURE 9 would include at the central station 57, a combined microphone and speaker 205′ whereby common input vocal data may be picked up and transmitted back to the selected inquiry stations connected for a certain collective purpose.

It is mentioned hereinbefore how it is contemplated that the recording instrument is to be operated at times without the flow of ink. In such instances, the main operating characteristic of an instrument is one of the measurements as influenced by pulses generated according to the number of rotations of the ball at the end of the recording instrument. In such instances the size of the ball is arranged to coincide with, or be equal to an even division of a graph space, or something such as longitudinal and latitude markings on a map. As another distinctive form of control accompanying such a measurement operation, the idea is to convert from a waveform signal to one having distinctive pulses representative of distances or measurements of area or volume associated with pictorial representations traced by the non-recording gyrations of the ball. As the magnetic flux of the ball is rotated end over end in a regular fashion past the coil location, the impulses are to be impressed through the lead wires and be representative in electrical fashion of the movements described by the end of the instrument. It is for such purposes that the showing in FIGURE 30 is arranged and, for purposes of illustration, the recording instrument is shown poised over a graph wherein the graph divisions are exactly one half the circumference of the control ball 11.

Referring to FIGURE 30, it is seen that an enlarged lower end of a ball point recording instrument 13 is shown in cooperation with a section of graph lined paper 216. In this illustration it is assumed that the relationship between the proportions of the magnetic material ball 11 and the divisions of the graph outline have a prearranged dimensional relationship. For example, if the ball diameter is assumed to be .100 of an inch then the main spaces may be assumed to be .31416. In other words, the large spaces of the graph are assumed to be equal to the circumference of the ball. Since the ball 11 is to be considered as a bar magnet and has opposite poles at two ends, then a large graph division may be divided in two so that the pulses generated by the ball 11 in moving a southpole and northpole successively past a winding such as the winding 219, which is shown diametrically opposed to the lower end of the orienting bar 23, so that oppositely polarized pulses will be equivalent to motion over each of the graph spaces shown outlined by lines such as 217 and 218.

For the purpose of graph measurement, it is assumed that the ball 11 is not only of magnetic material magnetized as a permanent magnet, but also that such material is of an external frictional nature so that there will be no skipping as the instrument 13 is drawn over the surface of the chart or graph 216.

As a means for measuring lines, areas, or solids, it is evident that the ball 11 may be drawn over a line such as line 227 and brought to a junction such as 228 and then oriented properly to assume an upward vertical movement as a continuation of the line. As such a ball point instrument is drawn over a chart showing, it is assumed that it is to be properly oriented by taking note of the position of an extension such as the bar magnet 23 or another extension such as the slide cam 225 to be mentioned hereinafter.

Hereinbefore the emphasis of the mode of electrical generation has been concentrated on the electrical wave mode form wherein characters when described by ordinary handwriting or printing movement cause the ball 11 to gyrate and hence create waveform signals rather than distinct pulses. Now in this presently shown embodiment FIGURE 30, there is at least one portion of it devoted to this pulse mode which is so useful for digital control and accurate measurement inasmuch as pulses are used rather than variations of waveforms. In order to generate peaked pulses by movement of the writing instrument, the winding 219 is oriented to be opposite one of the poles of the ball magnet 11 when it is turned in a normal linear position as shown in FIGURE 30. Then, as the instrument is drawn over a line to be measured, the ball 11 when properly oriented will turn end over end and thus generate pulses as the south, north, south, north, etc., poles revolve opposite the winding 219. FIGURE 30*a* shows an instrument 313 wherein there is a cylindrical rotor 311 which insures orientation for pulse emission when drawn over a graph. The rotor 311 is a magnet which is polarized either end to end or across the body as shown. When rolled the flux of the rotor cuts across winding 319 to generate peaked pulses.

In order to select the type of operation to be used in connection with movement with the instrument 13 there is shown a switch 213 which is connected to alternately select between a terminal 214 and 215 for the purpose of selecting either the pulse mode or the wave mode of operation, and these switch terminals are connected respectively to the windings 219 and 19 and in turn the switch is connected to lead wires 211 and 212 which are to be directed upward towards an amplifying device and other decoding means or digital counting means which are optional utilization devices for this versatile recording and measurement instrument.

For certain uses in the case of the pulse mode wherein measurement is the main object, it is evident that ink marking need not be carried on while the ball end is turning. In other words, the ink flow may be stopped so that the instrument is converted into a pulse emitting device rather than a recording instrument. For such purposes, the instrument shown in FIGURE 30 is provided with a means for stopping the ink flow optionally according to whether it is desired to record with either the wave mode or pulse mode, or to dispense with inking altogether.

The instrument body 13 (FIGURE 30) is shown to be formed with a central tube or channel 14 which is the ink conductor allowing the ink to flow down and partially encompass the top of the ball 11 with a film of ink which is ordinarily drawn around underneath to the recording side in the usual manner. To the left of the ink channel 14 there is formed an opening or groove 229 in which there is pivoted at 222 a lever 221. The lower end of lever 221 is formed as a cup-shaped finger in which there is deposited a soft rubber or plastic ball 220 ordinarily situated in and plugging a recess to the left of the ink tube 14 but optionally movable to the right to plug the opening at the lower end of tube 14.

Pressing against the upper end of lever 221 is a coil spring 223 which tends to hold the lever retracted so that the ball 220 is drawn out of the ink flow plugging position. However, the upper end 224 of the lever is rounded and subject to camming by a slideable cam 225 which is mounted in a dovetailed notch 226 in the wall of the writing instrument 13. When slide 225 is pushed downward it rocks the lever 221 counter-clockwise and plugs the ink channel 14 with the ball 220.

FIGURES 31 to 35 deal with alternative writing instrument embodiments illustrating that other forms of electrical generating equipment may be employed in converting from writing movements to waveform or pulse form output manifestations. FIGURES 31 and 31*a* are concerned with ball point pen forms of sound generating devices for revealing by changes in sound, the changing directions of writing movements. FIGURES 32 and 33 are nib forms of writing instrument points and differ in mode of operation and control from the various ball point pen arrangements set forth hereinbefore. These nib forms of writing pens are provided with either capacitive or resistance variation devices for influencing circuits to vary according to pen movements which in the nib form of fountain pen or writing pen tend to open the flexible points of such pens varying distances and at varying angles according to the characters being formed by the pent points. FIGURES 34 and 35 have to do with a pencil form of alternative instrument wherein the lead is of special striated form made up of layers of alternating soft and hard lead and so arranged that as the writing strokes differ in angle the change and application of the layers of lead to the paper cause differing sound effects. Inside the pencil is a sound pick-up microphone which then also carries such electrically generated signals to an amplifier and this in turn interprets the varying waveforms of sound and renders them subject to coding for interpretation and utilization.

Turning again to FIGURE 31 it is seen that the point 231 of a writing instrument may be made of brass or diamagnetic material and there hold at its tip a ball 232 in somewhat the usual fashion. However, the ball 232 in this instance has two unusual features; the one being that it is a permanent magnet and polarized as the case of a bar magnet and furthermore it is formed with bands of frictional indentations or extensions 233 and 234 which are sound generating features operating on the principle that roughened surfaces grated together create sound effects and in this case the various bands are scored with differing spacing so as to create differing sounds according to the angle of rotation. The magnetization of the ball 232 in this embodiment is not so much for the purpose of generating signals but rather for the purpose of providing means to orient the ball so that it has a particular starting position after each interval in which it is lifted off recording paper and permitted to swing back to a home position.

For purposes of orientation of the ball, the usual iron bar 23 is provided and here it may be noted that the bar 23 is not necessarily a permanent magnet with strong magnetic characteristics, for in most of the instances recited herein it is sufficient if the bar 23 is of magnetic material and serves to attract one or the other of the poles of the ball so that an unconfined ball is brought back to a normal position. All of this, of course, depends on the amount of friction between the ball surface and the recording paper. If the combined effects of the ball and paper are high degrees of friction then the bar 23 may be made a rather strong permanent magnet because the attraction of it will be readily overcome by the writing movement and the drag of the ball over the paper. However, in certain instances where the ball is intended to skip or be of relatively smooth exterior, then the bar 23 need not be a permanent magnet but merely comprise iron or some other magnetically attracted element or alloy material.

Since ball 232 has bands or areas of frictional characteristics in one or more places, it is apparent that such a ball is readily turned in cooperation with most forms of record material. In order to produce scratching sounds when such a ball is activated, the inside of the socket of the end of the ball point tip 231 is also embossed or engraved with one or more elongated ridges of roughened line of differing but evenly spaced marks 235 and 236. These embossing 235 and 236 in cooperation with one or more of the rotating bands 234, 233 will cause characteristic sounds according to the angle of writing between the stationary surface and the rubbing surfaces as various characters are formed. Such sounds are communicated through an opening in the bottom of the pen body and impinge against a microphone 237 which has extending lead lines 238 extending upwardly to amplifying devices either inside the pen or outside. Although for purposes of illustration, the microphone 237 is shown near the ball it is obvious that the sound conducting channel may extend quite a ways up the pen or even through flexible tubing outside the pen and the microphone be situated at a remote point and still receive the sounds serving to interpret the characteristic movements of the ball sound generating equipment operating when forming different characters.

FIGURE 31*a* deals with another form of sound effects writing instrument wherein the scratching arrangements of FIGURE 31 need not be used and instead the sounds are generated more directly by direct magnetic effects between a magnetic ball 11 and a diphragm 241. The body 240 of the writing instrument is formed in the usual fashion with an ink channel 14 and a permanent magnet ball 11 held in the usual fashion at the extreme lower end. A departure from the usual construction is made in this instance by mounting the diaphragm 241 near the operating surface of the rotating and gyrating magnetic ball 11. This diaphragm 241 is of the magnetizable variety wherein varying degrees of magnetic flux will cause the varying vibrations and such vibrations are understood to be in the presence of an interior U-shaped or other kind of coil holder wherein varying electrical waveforms are generated according to the fluctuations of the diaphragm. An instance of this is in the usual telephone ear pieces and mouth pieces operating on the basis of vibrating sound and electrical current or vibrating electrical currents producing sound in those instances. Here we have vibration induced by the fluctuations of the operating end of the writing instrument and subject to conversion to electrical fluctuation. Such fluctuations representing either character shapes or, if desired, varying sound representing waveforms. For example, knowing the wave pattern of vocal sounds or knowing the wave pattern of music sounds and also the generating characteristics of the ball 11, is is possible for a person to actually write vocal sounds or music. In this instance the term "write" being directed to the actual real time creation of music by the operation of a writing instrument. The microphone 242 is shown to have lead wires 243 which extend upwardly into amplifying and decoding equipment in the case of character generation. However, in the instance concerned with vocal sounds or music it is understood that the lead wires 243 may extend upwardly into amplifying and loud speaker devices either in the top of the pen or extending out beyond the pen and to such sounding equipment remote from the pen.

FIGURE 32 illustrates an alternative embodiment wherein a nib form of pen or fountain pen is provided with equipment for generating varying electrical waveforms according to the operation of the pen point with writing movements. The point 245 is seen to be formed with the usual pair of extending nibs separated by the slot 246 and the wide opening 247. However, in this instance there is a departure at the lower or writing end of the two nibs and there on the inside of such nibs is mounted a pair of capacitor plates 248 and 249. These plates are understood to be insulated with respect to the remainder of the pen point 245 except in those instances where such a point may be made of insulation material. When the pen point is at rest, such capacitor plates are narrowly separated, and then upon operating with writing movements for describing different characters i.e., when depressed to carry ink to a recording surface and pressed with varying degrees of pressure according to the strokes for making up characters which are usually emphasized with pressure on the down stroke and relieved on side strokes and up strokes, an electrical circuit varies. In any event, as a character is described the capacitor plates 248 and 249 are fluctuated in distance of separation with respect to each other and, when said plates are mounted in an electronic circuit by means of the extending leads 250, it is apparent that there will be created fluctuations in electrical waveforms which may be amplified and utilized as dealt with hereinbefore.

FIGURE 33 relates to another form of nib writing instrument point wherein even greater definition is to be determined than that set forth in FIGURE 32. In FIGURE 33 the nib of the pen 252 is divided into three slotted sections 253. While FIGURE 32 deals with capacitive variations for control, in the instance of FIGURE 33 the variations in pen movements are to be controlled by varying degrees of electrical resistance. In order to determine the types of varying strokes of the pen 252, the three extending nibs which are to be flexed differentially according to stroking for forming different characters in conducting the ink to a paper; these nibs have mounted at the upper flexing areas, strain gauges 254 which are separated in three sections; each strain gauge being at a critical stress area of one of the nibs 253. Each of these strain gauges 254 comprises a very sensitive resistance arrangement whereby any movement of flexure of the underlying metal upon which the strain gauge is mounted is instantly interpreted by changes in the resistance of the gauge which is carried back into amplified circuitry for rendering indications of the kinds of flexure. In the instance of a writing instrument such as that of FIGURE 33, it is apparent that the three sets of conducting leads 255 extending from the three different strain gauges will carry varying levels of voltages in these three instances according to whether a character formed required flexure on one side or another, or in the center or according to the over-all degree of flexure or lack of flexure depending on the stroking for the writing of a particular character.

Variable resistances and capacitance pick-off arrangements are shown in Patents 2,518,906 and 2,591,921.

FIGURES 34 and 35 are concerned with an alternative embodiment wherein pencil writing instruments are shown to be suitable for generating varying electrical waveforms representative of characters formed in writing strokes. FIGURE 34 shows a pencil body 259 formed centrally with an opening containing a form of writing lead 260. Although not shown, it is understood that such lead may be retracted and projected to take up wear in the usual fashion by any of the usual forms of retracting and projecting mechanisms. FIGURE 35 shows in cross-section the special character of the lead 260 which is formulated by laminating alternating layers of soft and hard lead, such layers being illustrated as 261 and 262, respectively. Such layers are shown in FIGURE 34 as extending vertically throughout the length of the lead 260 and oriented with respect to a polarized point around the circumference of the barrel 259 by a projection 258 which may be used as a guide for the fingers in holding the lead at a certain starting angle.

When such a form of lead is used to inscribe various characters, it is apparent that the vertical strokes will offer less obstruction and less scratching effects than horizontal strokes and, of course, in between movements at an angle either diagonally downward or diagonally upward will offer variations in the scratching sounds generated by such a piece of lead.

The sound effects generated by the varying frictional scratching of the lead 260 in making character impressions on a piece of record material are carried upwardly and generated against the receiving end of a microphone 263 wherefrom the fluctuating currents are carried further into an amplifying device 264 which may be a combined amplifying and decoding arrangement or decoding may be taken care of remotely by output wiring conducted out of the pen through a cable 265.

While the invention has been particularly shown and described with reference to a series of preferred embodiments thereof it will be understood by those skilled in the art that various changes in form and detail and mode of operation may be made therein without departing from the spirit and scope of the invention.

What is claimed is:

1. A ball tip instrument for writing motion engagement with a surface, said ball tip being adapted to gyrate during said writing motion engagement in accordance with the particular writing motions, characterized by:

said ball tip having a structural attribute which is the heterogeneity of the ball providing the gyratory capability of producing unique patterns of output signals characteristic of the particular writing motions; and means positioned adjacent to said ball tip and cooperative with said structural attribute of said ball tip during gyrations thereof to produce said unique patterns of output signals.

2. The instrument described in claim 1 including means to effect initial orientation of said ball tip to a home position.

3. The instrument described in claim 1 wherein said structural attribute is the magnetic composition of said ball tip and the polarization thereof;

said cooperative means comprise a conductor coil in which a fluctuating electric current characteristic of the particular writing motion is generated during gyration of said ball tip due to the cutting of lines of flux; and said output means for said signals comprise output leads from said coil.

4. The instrument described in claim 3 including a magnetic member positioned adjacent to said polarized ball tip to effect initial orientation of said ball tip to a home position.

5. The instrument described in claim 1 wherein said structural attribute is the non-magnetic composition of said ball tip and the provision thereon of at least one conductive line;

said cooperative means comprise a permanent magnet mounted adjacent to said ball tip to induce in said at least one conductive line a fluctuating electric current characteristic of the particular writing motion; and said output means for said signals comprise wiping contacts mounted in engagement with the surface of said ball tip to contact said at least one conductive line during said gyrations and output leads connected to said contacts.

6. The instrument described in claim 5 wherein said ball tip has a plurality of conductive lines arranged as a regularly spaced coil around the periphery thereof.

7. The instrument described in claim 1 wherein said structural attribute is a patterned roughening of the surface of said ball tip;

said cooperative means and said means to receive said output signals comprise an audio pickup member including a stylus mounted in contact with the surface of said ball tip and operative to vibrate in accordance with the patterned roughness encountered during gyration of said ball tip to generate signals characteristic of the particular writing motion.

8. The instrument described in claim 1 wherein said structural attribute is the magnetic composition of said ball tip and the polarization thereof;

said cooperative means comprise a magnetically responsive diaphragm which is vibrated in accordance with the gyrations of said ball tip to generate electric signals; and said output means for said signals comprise output leads.

9. The instrument described in claim 8 including a magnetic member positioned adjacent to said polarized ball tip to effect initial orientations of said ball tip to a home position.

10. The instrument described in claim 8 wherein said diaphragm is ferro-magnetic.

11. The instrument described in claim 1 wherein said structural attribute is the magnetic composition of said ball tip and the polarization thereof;

said cooperative means is a Hall device mounted adjacent to said ball tip, said Hall device including a plate of semiconductor material which is positioned within the magnetic field of said ball tip and means for applying electric signals to said plate; and said output means comprise signal output leads connected to said plate whereby the output on said output leads is a function of the input signals as modulated by the fluctuations of magnetic field caused by gyrations of said ball tip.

12. The instrument described in claim 11 including a magnetic member positioned adjacent to said polarized ball tip to effect initial orientations of said ball tip to a home position.

13. The instrument described in claim 1 wherein said structural attribute is the non-magnetic composition of said ball tip and the inclusion within said ball of a Hall device comprising a semiconductor plate having input and output leads extending to the surface of said ball;

said cooperative means and output means comprising means for creating a magnetic field across said ball tip, wiping contacts for said input and output leads and means for passing current through said input leads and said plate during gyration of said ball tip whereby said output signals on said output leads are a function of said current as modified by the variations in magnetic coupling with said plate as said plate assumes different orientations with said field as said ball tip gyrates.

14. A ball tip instrument for writing motion engagement with a surface, said ball tip being adapted to gyrate during said writing motion engagement and said gyration being effective to generate manifestations characteristic of the particular writing motions, characterized by:

said ball tip being of polarized magnetic material; and having a conductor coil positioned adjacent to said ball tip, whereby gyrations of said ball tip during writing motions cause the lines of flux eminating from said polarized ball tip to cut across said coil and generate fluctuating electric currents therein characteristic of the particular writing motions.

15. An instrument as described in claim 14 including a magnet adjustably mounted near a home position for one pole of said ball tip to initially orient said ball tip.

16. An instrument as described in claim 14 wherein said coil comprises a plurality of strands of conductive material formed in a bowed formation conforming to the shape of said ball with common ends connected to extending leads for conducting the generated current from said coil.

17. An instrument as described in claim 14 wherein said conductor coil is adjustably mounted for selective shifting to vary its position relative to said ball tip.

18. An instrument as described in claim 14 wherein said conductor coil is rotatably mounted for selective positioning relative to said ball tip.

19. An instrument for writing motion engagement with a surface, to generate manifestations characteristic of the particular writing motions, comprising:

a ball tip of polarized magnetic material mounted on one end of said instrument for gyratory motion during writing motion engagement of said ball tip with said surface, said ball tip comprising the rotor portion of an electric generator; and a conductor coil positioned adjacent to said ball tip and forming the stator portion of an electric generator, whereby gyrations of said ball during writing motions cause the lines of flux emanating from said polarized ball tip to cut across said coil and generate fluctuating electric currents therein characteristic of the particular writing motions.

20. A ball tip instrument for writing motion engagement with a surface, said ball tip being adapted to gyrate during said writing motion engagement and said gyration being effective to generate manifestations characteristic of the particular writing motions, characterized by:

said ball tip being of polarized magnetic material;

a Hall device mounted adjacent to said ball tip, said Hall device including a plate of semiconductor material which is positioned within the magnetic field of said ball tip;

signal output leads connected to said plate; and means for applying electric signals to said plate whereby the output on said output leads is a function of the input signals as modulated by the fluctuations of magnetic field caused by gyration of said ball tip.

21. The instrument described in claim 20 including a magnetic member positioned adjacent to said polarized ball tip to effect initial orientations of said ball tip to a home position.

22. A ball tip instrument for writing motion engagement with a surface, said ball tip being adapted to gyrate during said writing motion engagement and said gyrations being effective to generate manifestations characteristic of the particular writing motions, characterizered by:

said ball tip containing a Hall device plate;

means for passing a current through said plate during gyration of said ball tip;

means for applying a magnetic field across said ball tip and thus across said plate whereby a voltage produced in said plate is a function of said current through said plate as modulated by variations in coupling with said magnetic field due to the varying angular position of said plate relative to said field; and output means for extracting said produced voltage from said plate.

23. A ball tip inking instrument for writing motion engagement with a surface, said ball tip being adapted to gyrate during said writing motion engagement and said gyrations being effective to generate secondary manifestations characteristic of the particular writing motions in addition to depositing an inked pattern, characterized by:

said ink containing magnetic particles;

said ball tip being of polarized magnetic material whereby gyration of said ball tip during writing motion magnetically orients said magnetic particles in said inked pattern, said orientation being characteristic of the particular pattern.

24. The instrument described in claim 23 having a magnetic element positioned adjacent to said ball tip to orient said ball tip at a home position prior to writing motion engagement with said surface.

25. A ball tip instrument electrically controllable to execute writing motions, said ball tip being adapted to gyrate during said writing motions, characterized by:

said ball tip being of polarized magnetic material and forming the rotor portion of an electric motor;

conductor coils positioned around the periphery of said ball tip and forming the stator portion of an electric motor;

and means for applying electric signals characteristic of the desired writing motions to said conductor coils whereby motor action causes said ball tip to gyrate to effect writing motions of said instruments in accordance with the particular electric signal inputs.

26. The instrument described in claim 25 including a magnetic member positioned adjacent to said polarized ball tip to effect initial orientations of said ball tip to a home position.

27. An information handling system comprising:

a ball tip instrument for writing motion engagement with a surface;

said ball tip being adapted to gyrate during said writing motion engagement in accordance with the particular writing motions;

said ball tip having a structural attribute which is the heterogeneity of the ball providing the gyratory capability of producing unique patterns of output signals characteristic of the particular writing motion;

means positioned adjacent to said ball tip and cooperative with said structural attribute of said ball tip during gyration thereof to produce said unique patterns of output signals;

output means for said signals; and utilization means operative in response to said output signals.

28. The system described in claim 27 wherein said utilization means is a recorder for said output signals, said recorder being self-contained within said instrument.

29. The system described in claim 27 wherein said utilization device comprises a means for checking said patterns of output signals with stored patterns and means for indicating favorable comparisons.

30. The system described in claim 27 wherein said output means comprises a decoder for said output signals and said utilization means comprises a typewriter responsive to said decoded signals.

31. The system described in claim 27 wherein said utilization means comprises a facsimile recorder responsive to said output signals.

No references cited.

ROBERT C. BAILEY, *Primary Examiner.*

G. D. SHAW, *Assistant Examiner.*